(12) United States Patent
Nakahara et al.

(10) Patent No.: US 7,724,856 B2
(45) Date of Patent: May 25, 2010

(54) CLOCK RECOVERY CIRCUIT AND RECEIVER USING THE CIRCUIT

(75) Inventors: Hideki Nakahara, Hyogo (JP); Tomohiro Kimura, Osaka (JP); Hitoshi Takai, Osaka (JP); Kenichi Mori, Osaka (JP)

(73) Assignee: Panasonic Corporation, Osaka (JP)

( * ) Notice: Subject to any disclaimer, the term of this patent is extended or adjusted under 35 U.S.C. 154(b) by 528 days.

(21) Appl. No.: 10/591,152

(22) PCT Filed: Mar. 18, 2005

(86) PCT No.: PCT/JP2005/005596

§ 371 (c)(1),
(2), (4) Date: Jun. 1, 2007

(87) PCT Pub. No.: WO2005/091542

PCT Pub. Date: Sep. 29, 2005

(65) Prior Publication Data

US 2007/0297549 A1    Dec. 27, 2007

(30) Foreign Application Priority Data

Mar. 18, 2004 (JP) ............................. 2004-079298

(51) Int. Cl.
*H04L 7/00* (2006.01)
(52) U.S. Cl. .................................................... 375/355
(58) Field of Classification Search ................ 327/140, 327/159; 375/355
See application file for complete search history.

(56) References Cited

U.S. PATENT DOCUMENTS

| | | | | |
|---|---|---|---|---|
| 4,551,846 A | * | 11/1985 | Takeda et al. | 375/328 |
| 5,565,930 A | * | 10/1996 | Bolger et al. | 348/572 |
| 5,859,671 A | * | 1/1999 | Kim | 348/537 |
| 6,636,092 B1 | | 10/2003 | Stine | |

FOREIGN PATENT DOCUMENTS

| | | |
|---|---|---|
| JP | 04165954 | 11/1992 |
| JP | 2001035095 | 9/2001 |

* cited by examiner

*Primary Examiner*—David C Payne
*Assistant Examiner*—Leon-Viet Q Nguyen

(57) ABSTRACT

A clock recovery circuit capable of fast and accurate clock phase locking even in the presence of frequency shift and noise. The input signal includes, in order, a preamble with an alternating bit sequence pattern, a unique word and data. A detection unit detects zero crossings and measures the time interval therebetween. A 1-interval judgment unit judges whether an interval signal is within a predetermined range, and a 2-interval judgment unit sums two adjacent interval signals and judges whether the 2-interval signal is within a predetermined range. A control unit controls a zero-crossing signal based on the judgment result and outputs a valid zero-crossing signal if judged in the affirmative. A switching unit switches between outputting the zero-crossing signal and the valid zero-crossing signal as valid phase error information based on a frame reception signal input from a frame detection unit. A clock generation unit uses the valid phase error information in generating a symbol clock.

18 Claims, 38 Drawing Sheets

FIG. 5   PRIOR ART
| BIT<br>Xn Xn+1 | PHASE<br>TRANSITION |
|---|---|
| 1 1 | $-3\pi/4$ |
| 0 1 | $3\pi/4$ |
| 0 0 | $\pi/4$ |
| 1 0 | $-\pi/4$ |
FIG. 6   PRIOR ART
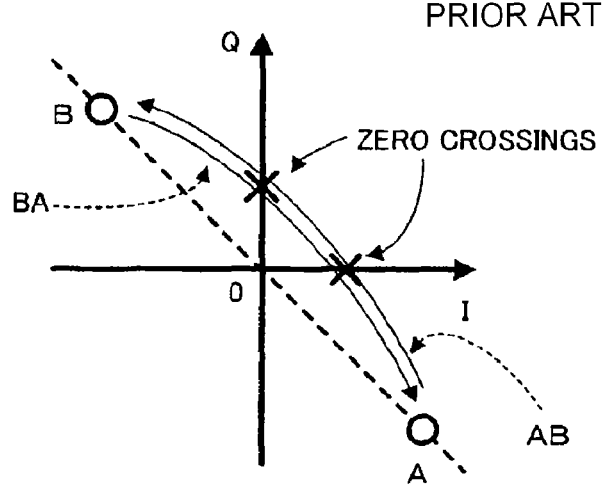
FIG. 7   PRIOR ART
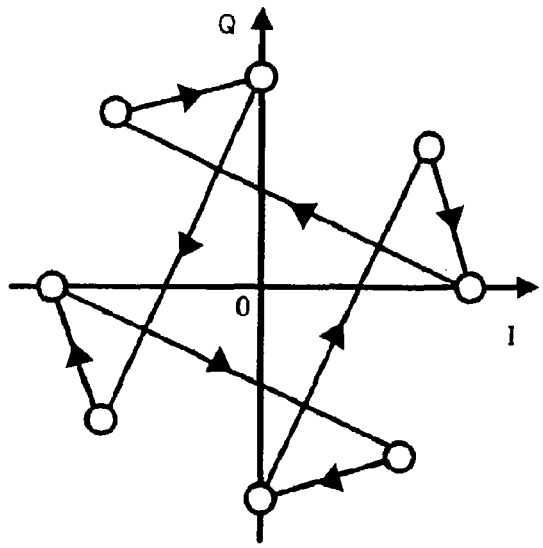

FIG.39
| | BIT $X_n\ X_{n+1}\ X_{n+2}$ | PHASE TRANSITION |
|---|---|---|
| S1 | 0 0 0 | $\pi/8$ |
| S2 | 0 0 1 | $3\pi/8$ |
| S3 | 0 1 1 | $5\pi/8$ |
| S4 | 0 1 0 | $7\pi/8$ |
| S5 | 1 1 0 | $-7\pi/8$ |
| S6 | 1 1 1 | $-5\pi/8$ |
| S7 | 1 0 1 | $-3\pi/8$ |
| S8 | 1 0 0 | $-\pi/8$ |
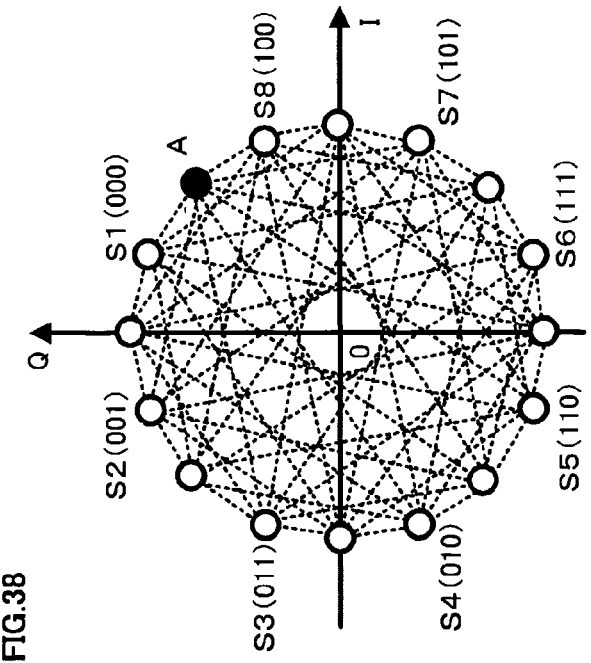
FIG.38
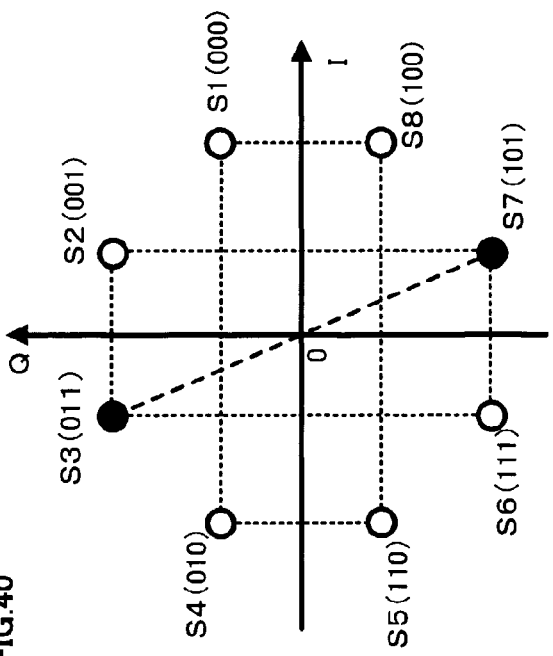
FIG.40

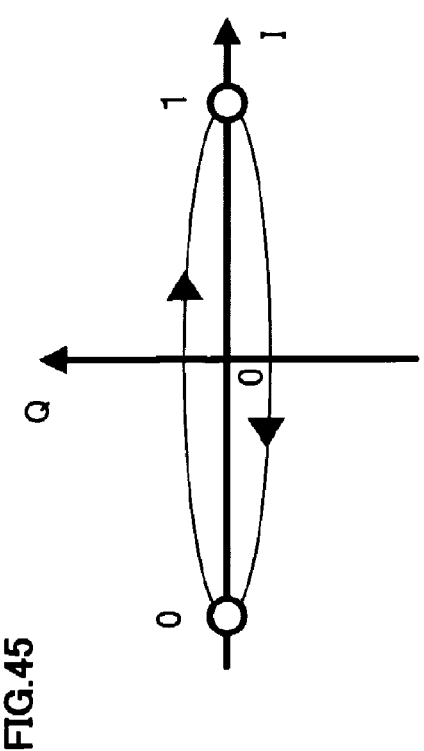
FIG.46
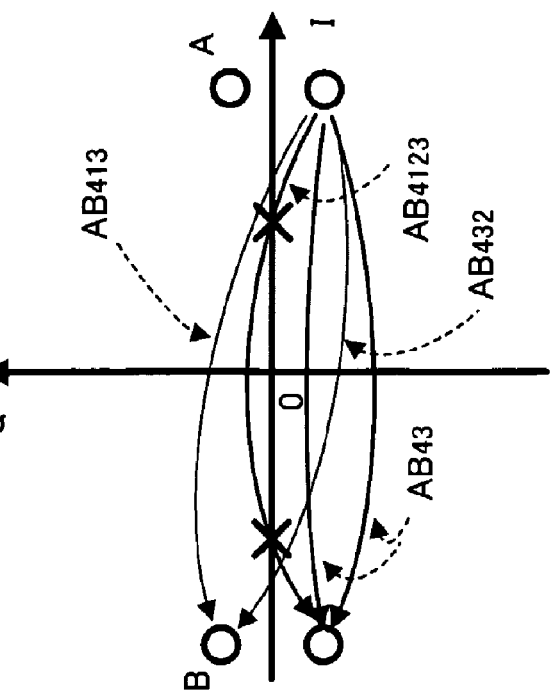
FIG.48
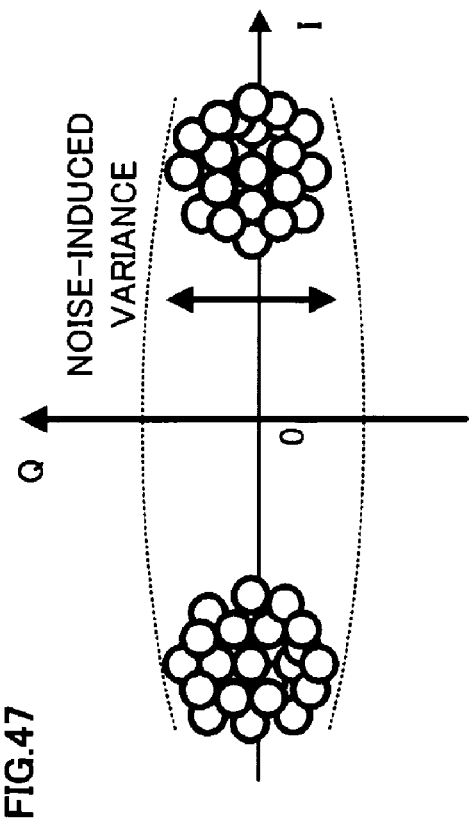
FIG.45
FIG.47

FIG.50
| | BIT $X_n X_{n+1}$ | PHASE TRANSITION |
|---|---|---|
| S1 | 0 0 | $\pi/4$ |
| S2 | 0 1 | $3\pi/4$ |
| S3 | 1 1 | $-3\pi/4$ |
| S4 | 1 0 | $-\pi/4$ |
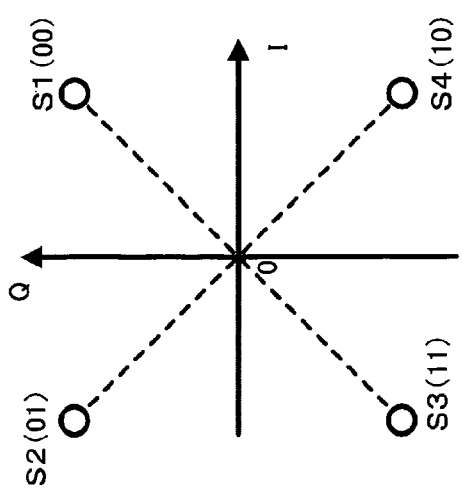
FIG.49
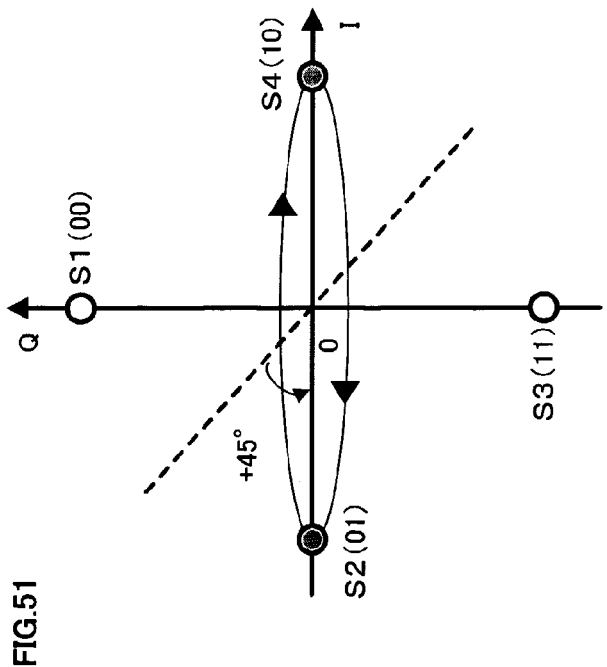
FIG.51

FIG.53
| | BIT $X_n\ X_{n+1}\ X_{n+2}$ | PHASE TRANSITION |
|---|---|---|
| S1 | 0 0 0 | 0 |
| S2 | 0 0 1 | $\pi/4$ |
| S3 | 0 1 1 | $2\pi/4$ |
| S4 | 0 1 0 | $3\pi/4$ |
| S5 | 1 1 0 | $\pi$ |
| S6 | 1 1 1 | $-3\pi/4$ |
| S7 | 1 0 1 | $-2\pi/4$ |
| S8 | 1 0 0 | $-\pi/4$ |
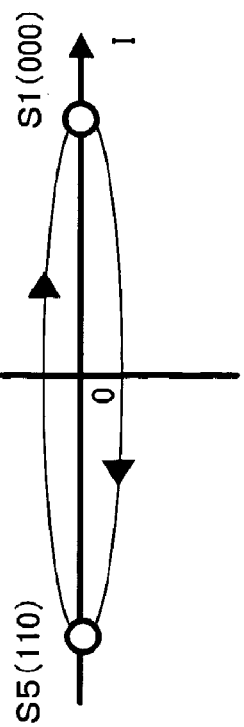
FIG.54
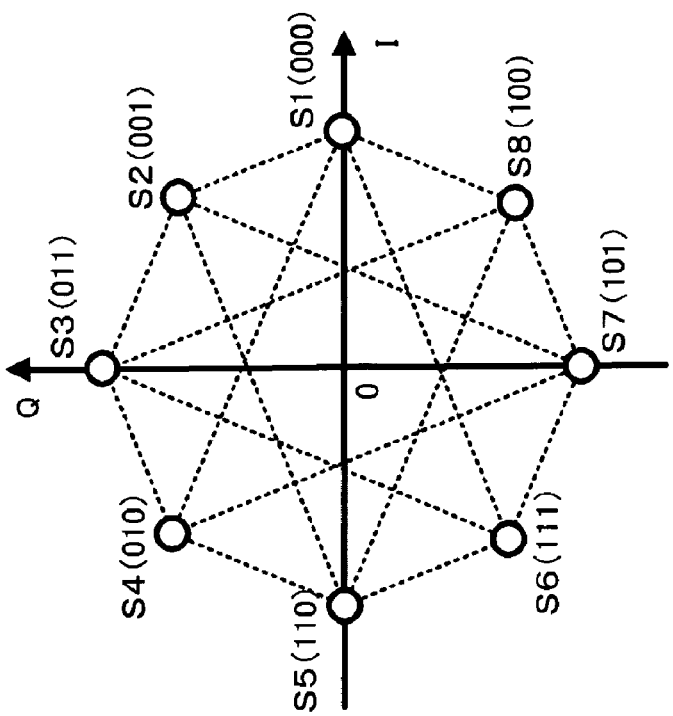
FIG.52

CLOCK RECOVERY CIRCUIT AND RECEIVER USING THE CIRCUIT

TECHNICAL FIELD

The present invention relates, in the field of cable and wireless communications, to a clock recovery circuit that generates a symbol clock used for data decision from a received signal, and to a receiver that uses the clock recovery circuit.

BACKGROUND ART

Technology for transmitting and receiving data divided into frames is widely used in the field of cable and wireless communications. In the frames used, a preamble (PR) and a unique word (UW) are prefixed ahead of data of a predetermined length. FIG. 2 shows a frame structure. The PR is provided at the head of the frame. The receiver performs gain control, frequency synchronization, symbol synchronization and the like during reception of the PR, in order to control the state in which the UW and data portions following the PR are received. Here, symbol synchronization is processing at the receiver to recover the timing (i.e. symbol clock) of the decision point at which the eye pattern of a symbol is most open, the symbol clock being generated by a clock recovery circuit.

In a typical method for clock recovery, the temporal position of zero crossings on both the in-phase (I) and quadrature (Q) axes are detected and used to recover the symbol clock. FIG. 3 schematically shows clock adjustment in a clock recovery circuit. In the clock recovery shown in FIG. 3, a phase error E with phase error information obtained from an input signal is detected based on a recovered symbol clock, and the clock phase is adjusted so as to reduce the phase error. Here, zero-crossing signals are used to adjust the clock phase in recovering the symbol clock, and thus referred to as phase error information. While fast phase locking is achieved when phase error information occurs successively within the symbol cycle because of the phase error being the same, phase locking is slowed when the phase error information occurs out of the symbol cycle due to the effects of jitter. An alternating pattern in which the phase of adjacent symbols inverts 180° is thus used in the PR, and the receiver obtains received data by generating a symbol clock using phase error information obtained successively from the alternating pattern and acquiring the decision point timing of the symbols based on the generated symbol clock.

Frequency shifts, phase noise and the like in the local oscillators of both the transmitter and the receiver cause phase shifts to occur between signals transmitted by the transmitter and signals received by the receiver. Frequency synchronization is thus required at the receiver, this processing being performed by a phase error correction (PEC) circuit for correcting phase shifts in received signals, or an automatic frequency control (AFC) circuit for directly controlling the oscillation frequency of the local oscillator in the receiver.

FIG. 4 shows the structure of a receiver. A PEC circuit 402 corrects phase errors in a detected signal input 411 from a signal detection unit 401, a clock recovery circuit 1 uses a phase-corrected signal 412 to generate a symbol clock 128, and a data decision unit 403 performs a data decision on phase-corrected signal 412 using symbol clock 128 to obtain received data 413. Note that symbol clock 128 is also used in PEC circuit 402 to calculate a phase correction value.

Normally, as shown in FIG. 4, correct received data can be obtained by performing the frequency synchronization (here, phase error correction) upstream of the symbol synchronization (here, symbol clock recovery). However, when frequency shift causes a large phase shift in the received signal, the cyclicity of the zero-crossing signals is disrupted. The phase error information thus becomes indeterminate due to multiple eyes opening in the symbol period when there should only be one eye, making clock recovery difficult. This is because the clock recovery circuit tries to lock the clock phase to the pseudo eyes. Also, errors occur in the phase correction performed at the PEC circuit based on the symbol clock generated by the clock recovery circuit, resulting in errors in the received data. Note that in the following description, phase shift in the detected signal caused by frequency shift is a different parameter to phase errors in the symbol clock being recovered.

In a conventional clock recovery technique using zero-crossing signals as phase error information, as shown in Japanese Patent Application Publication No. 2001-35095, only valid phase error signals are selected.

FIG. 37 is a block diagram showing the structure of an error selection circuit included in a clock recovery circuit recited in the above art. In the error selection circuit shown in FIG. 37, a T counter circuit 3700 measures the time interval between zero point information showing zero crossings, and an error-selection control signal generator 3701 judges whether the T count is within a predetermined range and outputs an error selection control signal based on the judgment result. An AND circuit 3704 evaluates both the current error selection control signal and the preceding error selection control signal stored at a D flip-flop circuit 3703, and outputs an error selection control signal 3710 based on the evaluation result to switching circuit 3706.

When the time intervals between the current zero crossings and the preceding zero crossings are both bit clock time periods that fall within a range defined by minimum and maximum values, the conventional error selection circuit outputs the phase error signal from a phase detector, having judged the phase error signal to show a substantially accurate phase error. On the other hand, if either one of these time intervals falls outside the set range, the conventional error selection circuit invalidates the phase error signal from the phase detector, having judged the phase error signal to be of doubtful accuracy.

The prior art is thus able to avoid causing phase fluctuation, bit slip and the like and thereby stabilize phase tracking performance, by validating only phase error signals relating to inversion intervals within the set range, and invalidating both phase error signals occurring immediately after short inversion intervals having a low signal level and phase error signals occurring immediately before and after long inversion intervals during which phase errors accumulate, due to the low reliability of phase errors in both cases.

In the field of cable and wireless communications targeted by the present invention, the following problems arise when a conventional error selection circuit applied in relation to binary digital signals in a digital signal player that plays information recorded on recording media such as DVD (digital versatile disc) performs symbol synchronization at the head of the frame with frequency shift in the received signal, during burst transmission using modulated signals in frame format.

Consider an example in which signals are modulated using π/4 DQPSK (Differential Quadrature Phase Shift Keying) Normally, an alternating pattern "10 01" is used in the PR sequence, and the clock recovery circuit uses a cyclic signal inherent in this sequential pattern as phase error information to recover the symbol clock. Note that FIG. 5 shows the phase transition amount for two bits ($X_n$, $X_{n+1}$) per symbol.

FIG. 6 shows the transition of a detected π/4 DQPSK signal when the alternating pattern. A signal point A in the −π/4 phase transits alternately with a signal point B in the 3π/4 phase. Here, the transition AB from point A to point B and the transition BA from point B to point A always transit in the same direction relative to the alternating axis. This transition is referred to here as an arc-shaped transition. The reason for this arc-shaped transition is as follows.

FIG. 7 shows the transition of a predetection π/4 DQPSK signal when the alternating pattern. The intermediate points ($M_{an}$, $M_{bn}$, where n=1, 2, 3, 4) of the signal transition shown in FIG. 8 are expressed as $M_{a1}$: $m_a \cdot \exp(\pi/8)$, $M_{b1}$: $m_b \cdot \exp(3\pi/8)$ $M_{a2}$: $m_a \cdot \exp(5\pi/8)$, $M_{b2}$: $m_b \cdot \exp(7\pi/8)$ $M_{a3}$: $m_a \cdot \exp(9\pi/8)$, $M_{b3}$: $m_b \cdot \exp(11\pi/8)$ $M_{a4}$: $m_a \cdot \exp(13\pi/8)$, $M_{b4}$: $m_b \cdot \exp(15\pi/8)$.

Therefore, the differential detection output at adjacent intermediate points ($M_{a1}$ & $M_{b1}$, $M_{b1}$ & $M_{a2}$, $M_{a2}$ & $M_{b2}$, $M_{b2}$ & $M_{a3}$, $M_{a3}$ & $M_{b3}$, $M_{b3}$ & $M_{a4}$, $M_{a4}$ & $M_{b4}$, $M_{b4}$ & $M_{a1}$) for all combinations can be expressed as $$m_a m_b \cdot \exp(\pi/4). \quad (1)$$

Expression 1 indicates that the transition of the differentially detected signal always has a component in a π/4 phase direction between two signal points. That is, the signal transits in the same direction relative to the alternating axis. Thus with π/4 DQPSK modulation, the transition of the differentially detected signal is arc-shaped when the PR sequence has the alternating pattern "10 01".

Described next is the case in which two or more zero crossings occur along one of the axes during signal transition due to frequency shift being included in a signal having arc-shaped transition characteristics.

FIG. 9 is a timing chart showing zero-crossing signals when phase shift is absent. As is also apparent from the FIG. 6 signal transitions, the fact that zero crossings occur within the symbol cycle long both the I/Q axes in the case of phase shift being absent means that zero-crossing signals along the I/Q axes occur at one symbol intervals with respect to the symbol clock being recovered, and thus the successive phase errors $E_I$ and $E_Q$ are respectively the same. Accordingly, these zero-crossing signals are valid phase error information.

FIG. 10 schematically shows signal transition with additive +45° phase shift and noise in the detected signal shown in FIG. 6. As shown in FIG. 10, the signal points disperse with additive noise, widening the locus of the signal transition.

FIG. 11 is a schematic diagram showing the detected signal in FIG. 10 crossing the I/Q axes. The majority of transitions AB can be classified into the following four types.

Transition $AB_{12}$: $1^{st} \rightarrow 2^{nd}$ quadrant

Transition $AB_{123}$: $1^{st} \rightarrow 2^{nd} \rightarrow 3^{rd}$ quadrant

Transition $AB_{412}$: $4^{th} \rightarrow 1^{st} \rightarrow 2^{nd}$ quadrant

Transition $AB_{4123}$: $4^{th} \rightarrow 1^{st} \rightarrow 2^{nd} \rightarrow 3^{rd}$ quadrant FIG. 12 is a schematic diagram showing zero-crossing signals and phase errors for transition $AB_{4123}$. With transition $AB_{4123}$, zero-crossing signals occur along both the I/Q axes as shown in FIG. 12. Note that with phase error $E_I$ in the in-phase (I) component, at least two zero-crossing signals occur per symbol period owning to the arc-shaped signal transition.

Consider an example in which the conventional error selection circuit discussed above judges the validity of phase error information when the input signal corresponds to the PR and the detected signal alternates in sign. In the case of two zero-crossing signals occurring at regular intervals (=0.5 T, where T=1 symbol period) per symbol period, pseudo eyes occur on either side of the eye pattern originally to be captured. While the true eye needs to be specified and sampled from this signal as phase error information, clock recovery with the conventional error selection circuit is unstable because of the two zero-crossing signals per symbol period being judged valid when Tcmin is set below 0.5 T. On the other hand, phase error information is not detected when Tcmin is set above 0.5 T because of both zero-crossing signals being judged invalid, making clock recovery impossible. Thus when the conventional error selection circuit is applied in relation to an alternating pattern PR with phase shift caused by frequency shift present in the detected signal, normal clock locking operations cannot be realized.

DISCLOSURE OF THE INVENTION

In view of the above problems, an object of the present invention is to provide a clock recovery circuit that operates stably with respect to a signal in which multiple zero crossings occur per symbol period, and a receiver that uses the clock recovery circuit.

To achieve the above object, a clock recovery circuit for recovering a symbol clock from an input signal includes: an N-interval detection unit operable to detect an N zero-crossing interval with reference to N+1 zero-crossing signals obtained from the input signal, where N is an integer greater than or equal to 2; a judgment unit operable to judge whether the N zero-crossing interval is within a predetermined interval range; and a clock generation unit operable to generate a symbol clock based on a result of the judgment.

According to this structure, the clock recovery circuit judges whether an N zero-crossing interval (i.e. combination of N adjacent intervals between zero crossings in an input signal) is within a predetermined range, and generates a symbol clock depending on whether zero-crossing signals are validated or invalidated. Here, valid zero-crossing signals are used in generating the symbol clock, while invalid zero-crossing signals are ignored.

By using the generated symbol clock to evaluate phase error information, the cyclicity inherent in the preamble can be most effectively sampled, enabling faster locking of the clock phase in recovering the symbol clock.

The above object is also achieved by a clock recovery circuit for recovering a symbol clock from a signal obtained by detecting a modulated signal that includes: an I-component processing unit operable to generate phase error information with reference to an in-phase signal obtained from the detected signal; an Q-component processing unit operable to generate phase error information with reference to a quadrature signal obtained from the detected signal; and a clock generation unit operable to generate and output a symbol clock based on phase error information. Here, each processing unit includes an N-interval detection subunit and an M-interval detection subunit (N, M=positive integers; N>M), judges whether an N zero-crossing interval and an M zero-crossing interval detected by the N and M interval detection subunits are within respective predetermined interval ranges based on a zero-crossing signal obtained from each of the in-phase signal and the quadrature signal, validates the zero-crossing signal if judged in the affirmative for both the N and M zero-crossing intervals, and invalidates the zero-crossing signal if judged in the negative for either the N or M zero-crossing interval. If one of the processing units invalidates and the other processing unit validates, the clock generation unit adjusts a phase of the symbol clock based on the phase error information of the validating processing unit, and outputs the phase-adjusted symbol clock.

This structure, as with above structure, enables faster locking of the clock phase in recovering the symbol clock.

The above object is also achieved by a clock recovery circuit for recovering a symbol clock from an input signal that includes a preamble, the clock recovery circuit including: a zero-crossing detection unit operable to detect a temporal position of zero crossings from the input signal, and output zero-crossing signals; an interval detection unit operable to derive a time interval between adjacent zero crossings from the zero-crossing signals, and output interval signals; a 1-interval judgment unit operable to judge whether each interval signal is within a predetermined interval range; a 2-interval judgment unit operable to generate a 2-interval signal by summing two adjacent interval signals, and judge whether the 2-interval signal is within a predetermined interval range; a control unit operable to validate or invalidate each zero-crossing signal based on a judgment result of the judgment units, and output a valid zero-crossing signal; and a clock generation unit operable to generate a symbol clock based on the valid zero-crossing signal.

According to this structure, the clock recovery circuit judges whether separate predetermined intervals (e.g. a 1 zero-crossing interval, and a 2 zero-crossing interval obtained by combining two single intervals) are within respective predetermined ranges, with the clock generation unit using only validated zero-crossing signals as phase error information. This allows the cyclicity inherent in the preamble to be most effectively sampled, enabling faster locking of the clock phase in recovering the symbol clock.

Here, the 1-interval judgment unit holds a minimum time interval of 0 to 1 symbol periods and a maximum time interval 1 to 2 symbol periods as the predetermined interval range, and the 2-interval judgment unit holds a minimum time interval of 1 to 2 symbol periods and a maximum time interval of 2 to less than 3 symbol periods as the predetermined interval range.

The above object is also achieved by a receiver for receiving a modulated signal having a frame structure that includes a preamble, a specific pattern and data, the receiver including: a signal detection unit operable to detect the received signal, and output an in-phase signal and a quadrature signal; and a clock recovery unit operable to recover a symbol clock from the in-phase and quadrature signals. The clock recovery unit includes: a frame detection subunit operable to detect the specific pattern from the in-phase and quadrature signals, and output a frame reception signal indicating data reception; a zero-crossing detection subunit operable to detect a temporal position of zero crossings from the in-phase and quadrature signals, and output in-phase zero-crossing signals and quadrature zero-crossing signals; an interval detection subunit operable to derive a time interval between adjacent zero crossings from the in-phase and quadrature zero-crossing signals, and output in-phase interval signals and quadrature interval signals; a 1-interval judgment subunit operable to judge whether each in-phase and quadrature interval signal is within a predetermined interval range; a 2-interval judgment subunit operable to sum two adjacent in-phase interval signals and two adjacent quadrature interval signals to generate an in-phase 2-interval signal and a quadrature 2-interval signal, and judge whether each in-phase and quadrature 2-interval signal is within a predetermined interval range; a control subunit operable to validate or invalidate each in-phase and quadrature zero-crossing signal based on a judgment result of the judgment subunits, and output in-phase and quadrature valid zero-crossing signals; a switching subunit operable to switch between outputting the in-phase and quadrature zero-crossing signals and the in-phase and quadrature valid zero-crossing signals, based on the frame reception signal; and a clock generation subunit operable to generate a symbol clock based on the in-phase and quadrature signals output from the switching unit.

Thus, even when frequency shift is present in a modulated signal whose frame structure includes a preamble, a specific pattern and data in the stated order, this structure allows the preamble to be used to effectively sample the cyclicity inherent in the preamble, enabling faster locking of the clock phase in recovering the symbol clock.

The above object is also achieved by a receiver for receiving a modulated signal having a frame structure that includes a preamble, a specific pattern and data, the receiver including: a signal detection unit operable to detect the received signal, and output an in-phase signal and a quadrature signal; and a clock recovery unit operable to recover a symbol clock from the in-phase and quadrature signals. The clock recovery unit includes: a frame detection subunit operable to detect the specific pattern from the in-phase and quadrature signals, and output a frame reception signal indicating data reception; a zero-crossing detection subunit operable to detect a temporal position of zero crossings from the in-phase and quadrature signals, and output in-phase zero-crossing signals and quadrature zero-crossing signals; an interval detection subunit operable to derive a time interval between adjacent zero crossings from the in-phase and quadrature zero-crossing signals, and output in-phase interval signals and quadrature interval signals; a center detection subunit operable to detect a temporal position of a center between adjacent in-phase and adjacent quadrature zero-crossing signals, and output in-phase center signals and quadrature center signals; a 1-interval judgment subunit operable to judge whether each in-phase and quadrature interval signal is within a predetermined interval range; a 2-interval judgment subunit operable to sum two adjacent in-phase interval signals and two adjacent quadrature interval signals to generate an in-phase 2-interval signal and a quadrature 2-interval signal, and judge whether each in-phase and quadrature 2-interval signal is within a predetermined interval range; a control subunit operable to validate or invalidate each in-phase and quadrature center signal based on a judgment result of the judgment subunits, and output in-phase and quadrature valid center signals; a switching subunit operable to switch between outputting the in-phase and quadrature zero-crossing signals and the in-phase and quadrature valid center signals, based on the frame reception signal; and a clock generation subunit operable to generate a symbol clock based on the in-phase and quadrature signals output from the switching unit.

With this structure, the temporal position at the center of adjacent zero crossings is used as valid phase error signals, in addition to the judgments performed by the 1-interval and 2-interval judgment units. Accordingly, even when frequency shift is present in a modulated signal whose frame structure includes a preamble, a specific pattern and data in the stated order, the preamble can be used to effectively sample the cyclicity inherent in the preamble, enabling faster locking of the clock phase in recovering the symbol clock.

BRIEF DESCRIPTION OF THE DRAWINGS

FIG. 5 is a table showing a π/4 DQPSK differential encoding rule;

FIG. 6 is a schematic diagram showing the transition of a detected π/4 DQPSK signal when an alternating pattern;

FIG. 7 is a schematic diagram showing the transition of a predetection π/4 DQPSK signal when an alternating pattern;

FIG. 38 is a signal space diagram of a predetection π/8 8 PSK signal;

FIG. 39 is a table showing a π/8 8 PSK differential encoding rule;

FIG. 40 is a signal space diagram of a differentially detected π/8 8 PSK signal;

FIG. 45 is a signal space diagram of a detected BPSK signal;

FIG. 46 is a table showing a BPSK encoding rule;

FIG. 47 is a schematic diagram of signal transition with additive noise in a detected BPSK signal;

FIG. 48 is a schematic diagram showing zero crossings of the BPSK signal in FIG. 47 along the I-axis;

FIG. 49 is a signal space diagram of a detected QPSK signal;

FIG. 50 is a table showing a QPSK encoding rule;

FIG. 51 is a schematic diagram showing the transition of a detected QPSK signal that includes +45° phase shift when an alternating pattern;

FIG. 52 is a signal space diagram of a detected 8 PSK signal;

FIG. 53 is a table showing an 8 PSK encoding rule; and

FIG. 54 is a schematic diagram showing the transition of a detected 8 PSK signal that includes +45° phase shift when an alternating pattern.

BEST MODE FOR CARRYING OUT THE INVENTION

Embodiment 1

Figure 1:
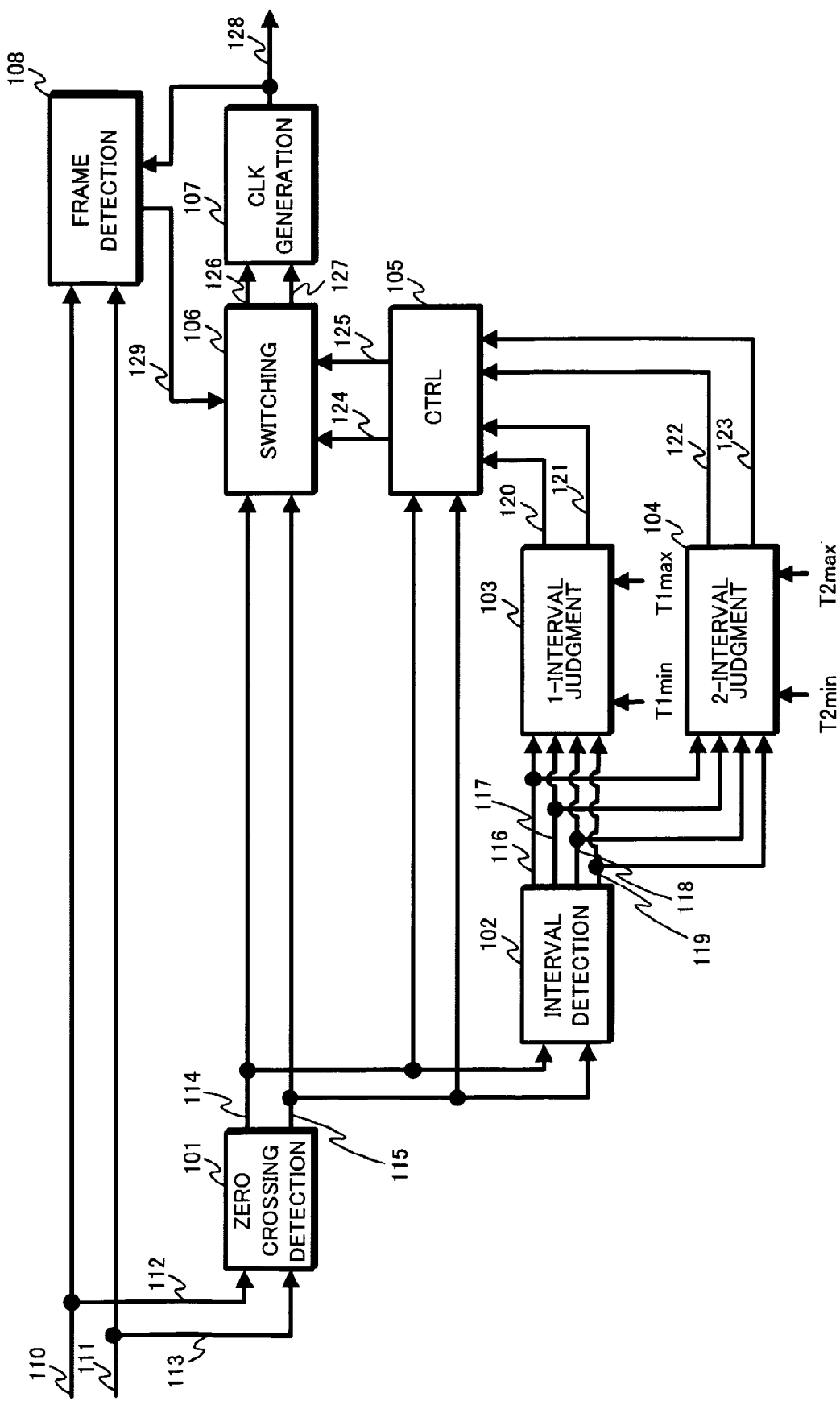
FIG. 1 is a block diagram showing the structure of a clock recovery circuit pertaining to an embodiment 1 of the present invention.
Figure 2:
FIG. 2 is a schematic diagram showing a typical frame structure.

FIG. 1 is a block diagram showing the structure of a clock recovery circuit pertaining to an embodiment 1 of the present invention. Clock recovery circuit 1 includes a zero-crossing detection unit 101, an interval detection unit 102, a 1-interval judgment unit 103, a 2-interval judgment unit 104, a control unit 105, a switching unit 106, a clock generation unit 107, and a frame detection unit 108. Detected signals having the frame structure in FIG. 2 are input to clock recovery circuit 1.

Figure 4:
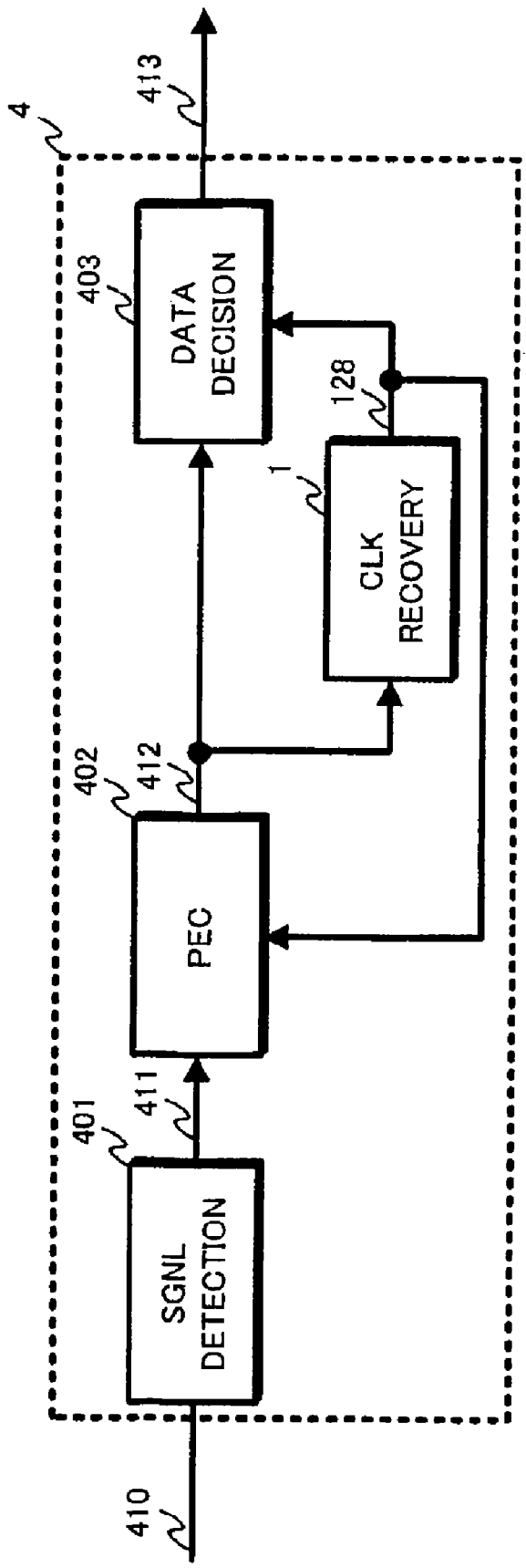
FIG. 4 is a block diagram showing the structure of a typical receiver.
Figure 8:
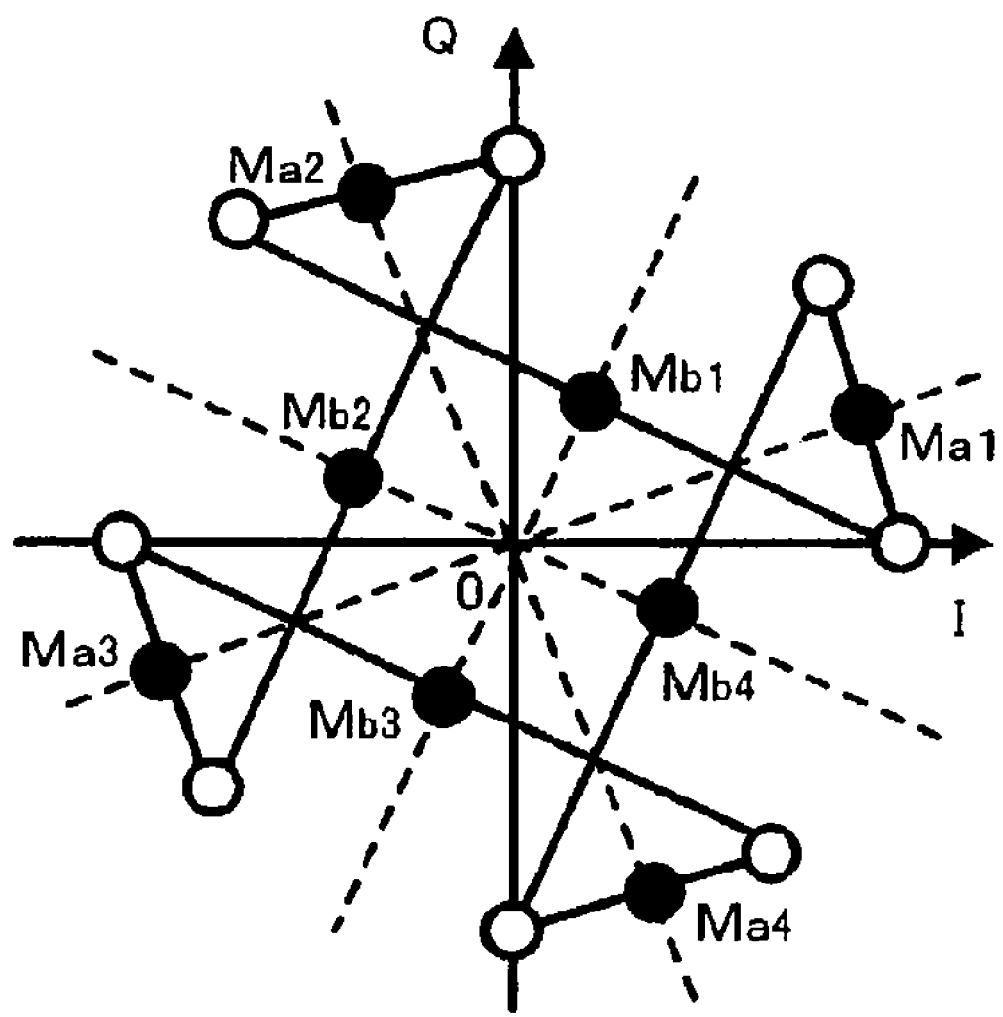
FIG. 8 is a schematic diagram showing intermediate points in the signal transition of FIG. 7.
Figure 9:
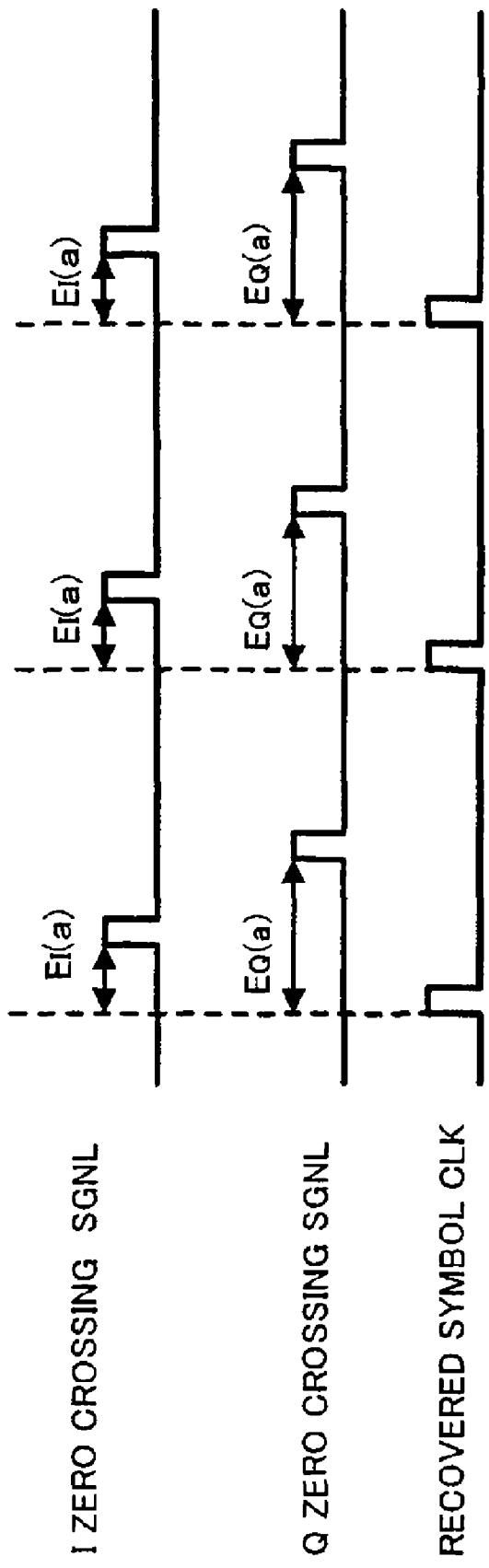
FIG. 9 is a timing chart showing zero-crossing signals in the case of phase shift being absent.
Figure 10:
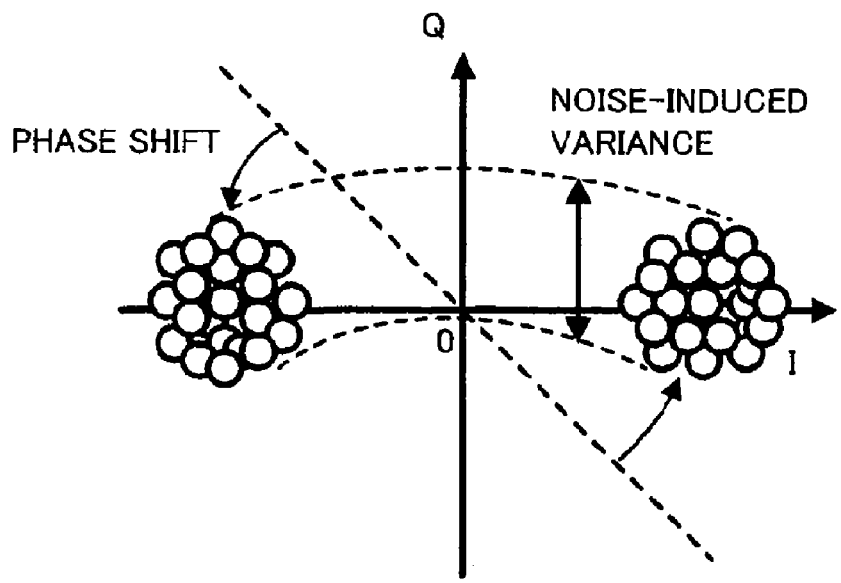
FIG. 10 is a schematic diagram of signal transition with additive +45° phase shift and noise in the detected signal in FIG. 6.

FIG. 4 is a block diagram showing the structure of a receiver 4 that includes clock recovery circuit 1. As shown in FIG. 4, a signal detection unit 401 and a phase error correction (PEC) circuit 402 are provided upstream of clock recovery circuit 1, and a data decision unit 403 is provided downstream. Receiver 4 receives modulated signals from a transmitter (not depicted). Signal detection unit 401 detects a received signal 410 and outputs a detected signal 411. PEC circuit 402 acquires the timing of the optimum decision point from a symbol clock 128 output from clock recovery circuit 1, calculates the phase correction value, and corrects the phase of detected signal 411. Data decision unit 403 obtains received data 413 from a symbol decision point specified using recovered symbol clock 128.

Phase-corrected signal 412 is input to clock recovery circuit 1. Detected signal 411 is assumed here to result from differentially detecting a π/4 DQPSK modulated signal, for example. Input signal 412 has the frame structure shown in FIG. 2. Each frame includes a preamble (PR) portion, a unique word (UW) portion and a data portion in order from the head thereof. A data pattern in which the phase angle inverts 180° between two adjacent symbols is set in the PR portion. Here, this alternate inversion of the phase angle by 180° from one symbol to the next is referred to as "the symbols alternating in sign", and the pattern formed by the alternating symbols is referred to as an "alternating pattern". The alternating pattern set in the PR has a predetermined length (i.e. data pattern in which a predetermined number of symbols alternate) A data pattern for establishing frame synchronicity is set in the UW portion. Data divided into a predetermined length is set in the data portion.

The different blocks of clock recovery circuit 1 shown in FIG. 1 are described next. Note that to assist comprehension, the following description refers only to the in-phase (I) component of the phase-corrected signal input to clock recovery circuit 1, given that the quadrature (Q) component is processed similarly.

Figure 13:
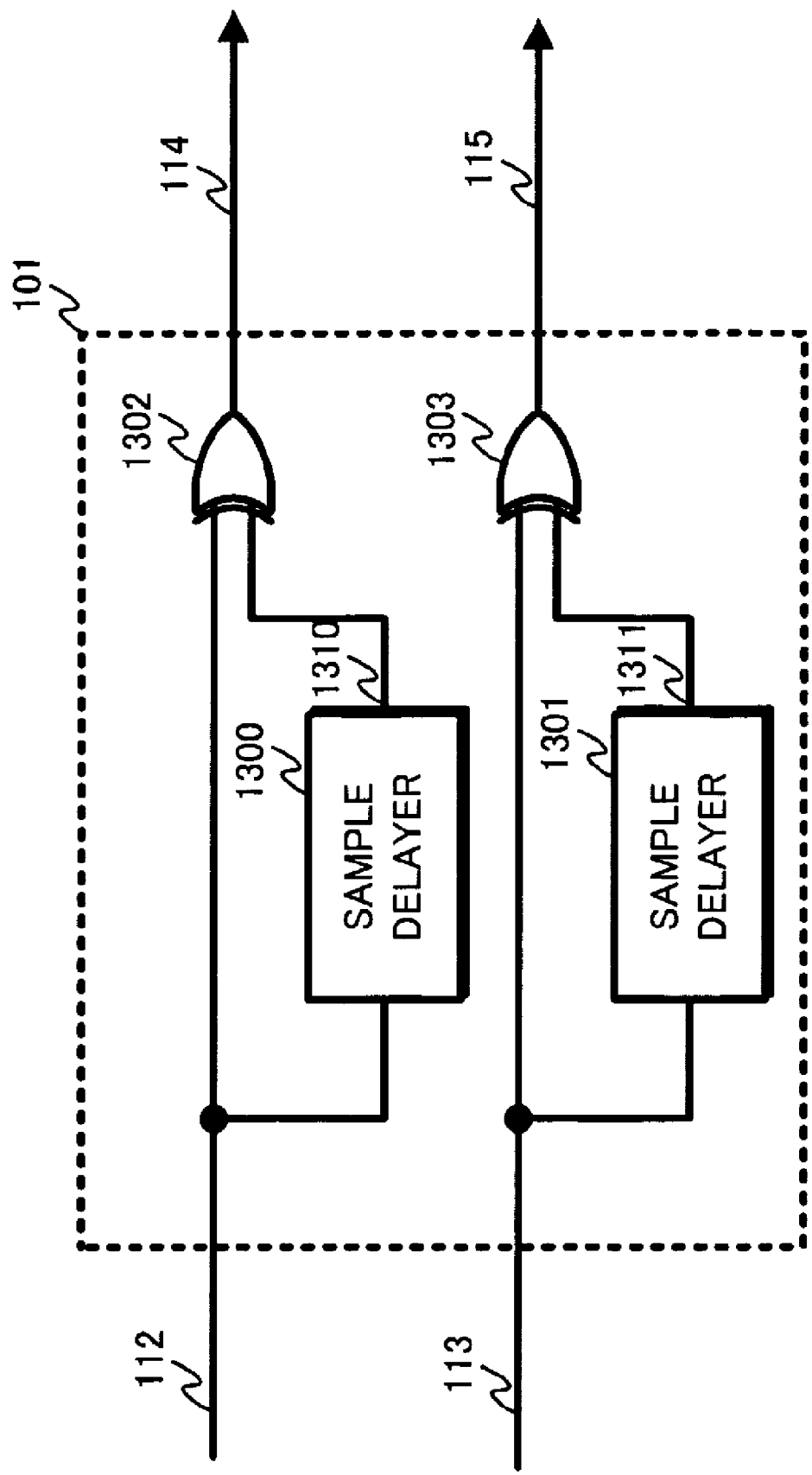
FIG. 13 is a block diagram showing a detailed structure of a zero-crossing detection unit 101.

Zero-crossing detection unit 101 is shown in detail in FIG. 13. Unit 101 includes sample delayers 1300 and 1301, and XOR (exclusive-OR) circuits 1302 and 1303. Sample delayer 1300 delays a detected signal 112 by one sample, and detects changes in the sign of detected signal 112 by performing an XOR operation on the current signal and the 1-sample delayed signal. That is, sample delayer 1300 detects zero crossings in the I-component of phase-corrected signal 412 (see FIG. 4), and outputs zero-crossing signals 114.

Figure 14:
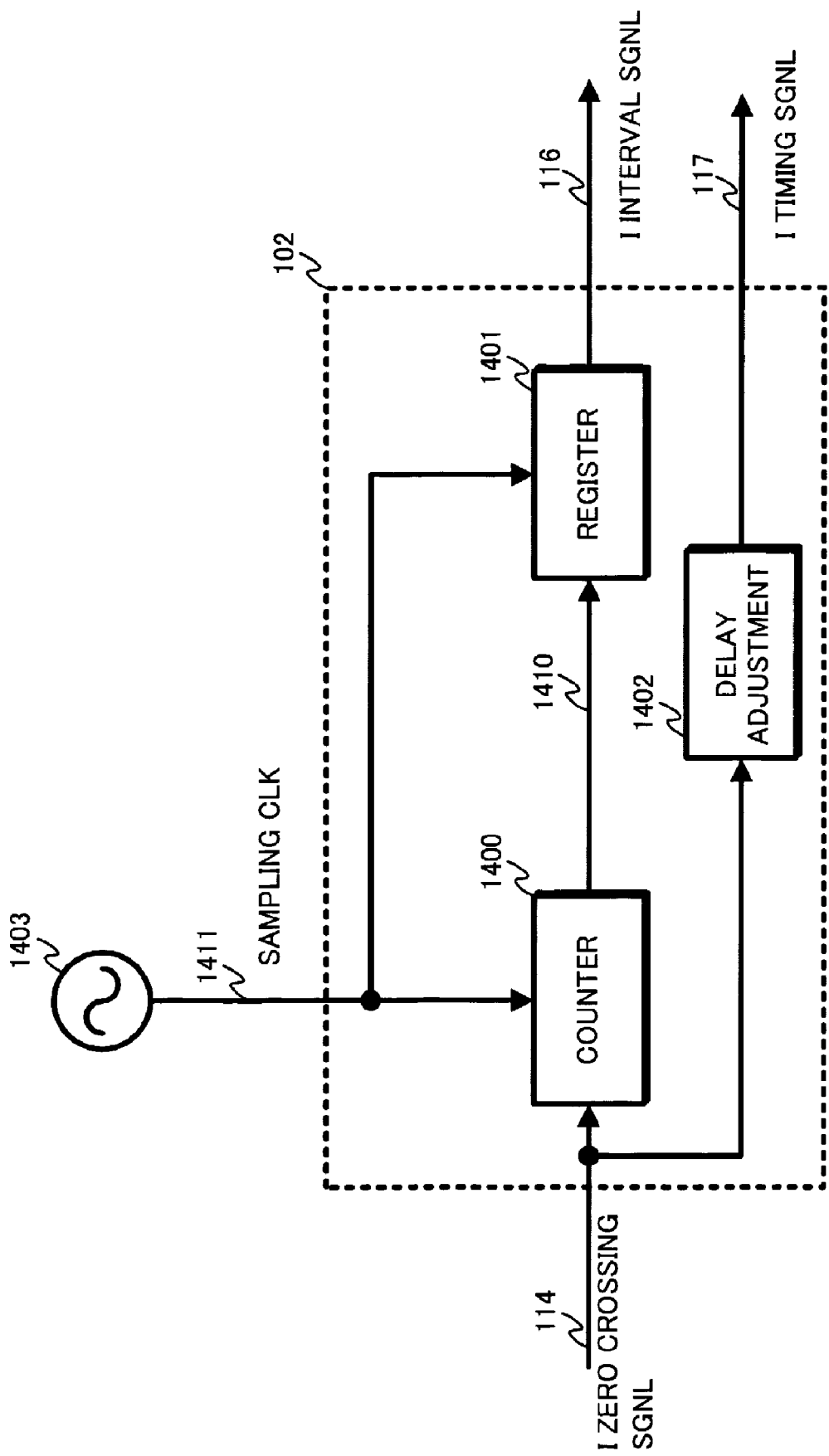
FIG. 14 is a block diagram showing a detailed structure of an interval detection unit 102.

Interval detection unit 102 is shown in detail in FIG. 14. Unit 102 includes a counter 1400, a register 1401, and a delay adjustment unit 1402. Using zero-crossing signal 114 as a reset signal, counter 1400 counts up by "1" every time an externally supplied sampling clock 1411 is input. When the counter value is reset to "0", register 1401 outputs the accumulated counter value 1410 held immediately before the resetting as interval signal 116. Delay adjustment unit 1402 delay adjusts zero-crossing signal 114, and outputs the delay adjusted signal as an timing signal 117 indicating the end of interval signal 116.

1-interval judgment unit 103 (not depicted in detail), which can be realized by a known comparator circuit, judges whether interval signal 116 (L1I) is within a predetermined range defined by minimum and maximum 1-interval thresholds T1min and T1max, and outputs an 1-interval control signal 120 based on the judgment result. 1-interval judgment unit 103 sets 1-interval control signal 120 to valid (here, "high level", or simply "high") if T1min≦L1I≦T1max, and to invalid (here, "low level", or simply "low") in all other cases.

Figure 15:
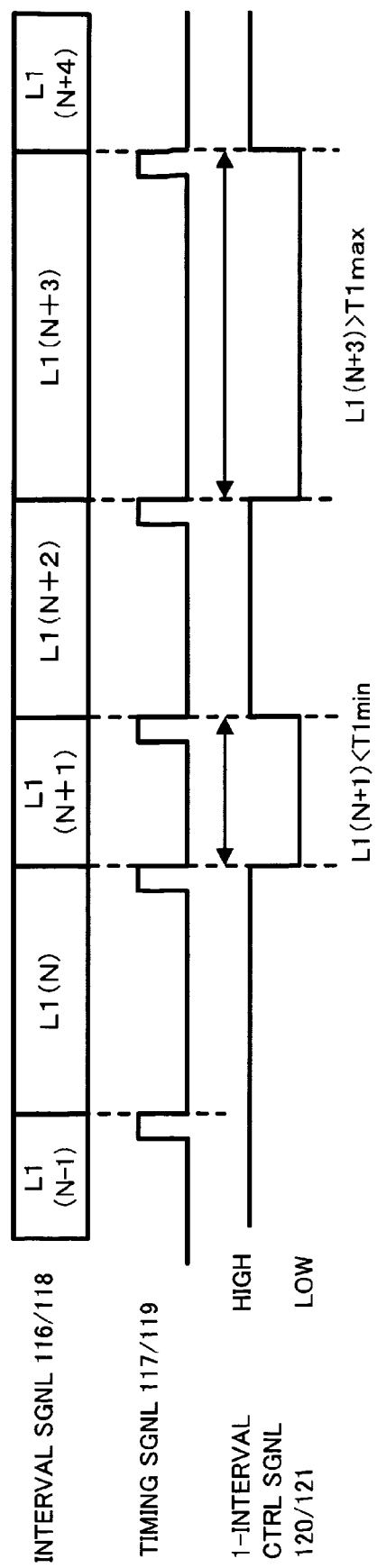
FIG. 15 is a timing chart showing the transition of I/Q signals in a 1-interval judgment unit 103.

FIG. 15 shows the timing of I/Q signals in 1-interval judgment unit 103. As shown in FIG. 15, the segments L1(N+1) and L1(N+3) have been invalidated (low). Note that "L1" in FIG. 15 collectively denotes the 1-interval length of both the I (116) and Q (118) components of the interval signal. In later description, "L2" is used to denote the 2-interval length of a 2-interval signal, while "I" (in-phase) and "Q" (quadrature) are appended when referring specifically to the I or Q components of a signal (e.g. "L1I"=1-interval length of I-component; "L2Q"=2-interval length of Q-component)

Figure 16:
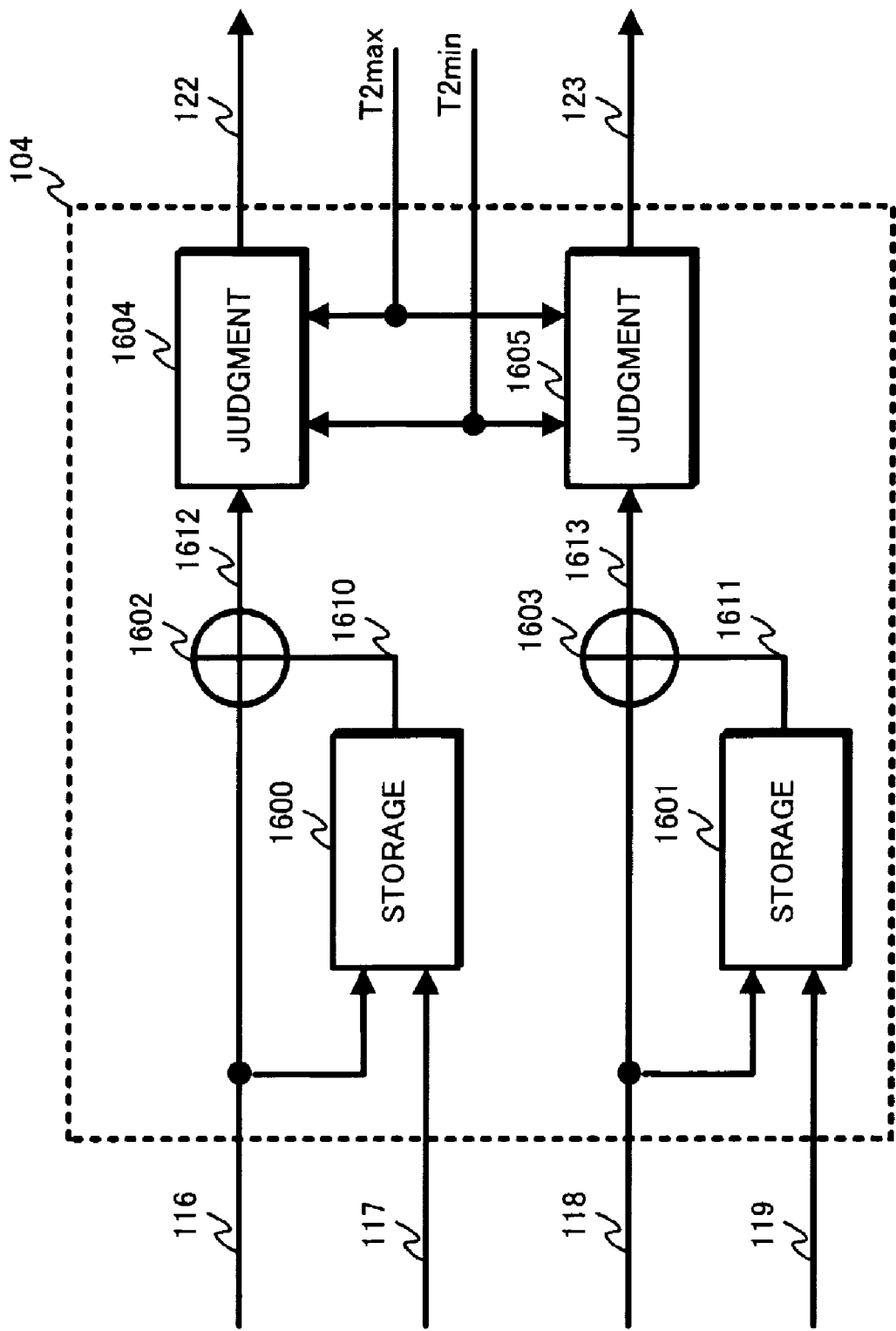
FIG. 16 is a block diagram showing a detailed structure of a 2-interval judgment unit 104.

2-interval judgment unit 104 is shown in detail in FIG. 16. Unit 104 includes storage units 1600 and 1601, adders 1602 and 1603, and judgment units 1604 and 1605. Storage unit 1600 sequentially stores interval signal 116 every time timing signal 117 is input. Adder 1602 sums the current interval signal 116 and the delayed (preceding) interval signal 1610 stored in storage unit 1600, and outputs the resultant value as 2-interval signal 1612. Judgment unit 1604 judges whether 2-interval signal 1612 (L2I) is within a predetermined range defined by minimum and maximum 2-interval lengths T2min and T2max, and outputs an 2-interval control signal 122 based on the judgment result. 2-interval judgment unit 104 sets 2-interval control signal 122 to valid (high) when T1min≦L2I≦T1max, and to invalid (low) in all other cases.

Figure 17:
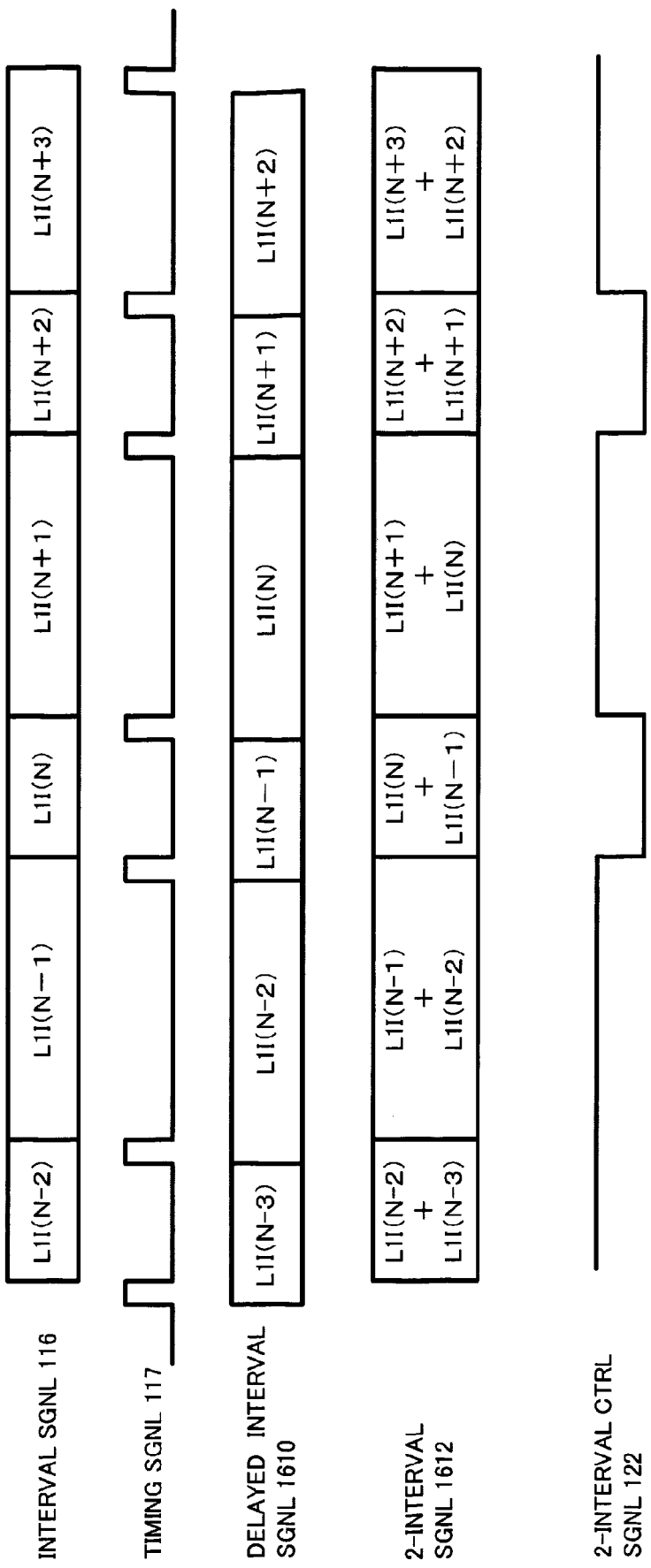
FIG. 17 is a timing chart showing the transition of I-signals in 2-interval judgment unit 104.

FIG. 17 is a timing chart showing the transition of signals in 2-interval judgment unit 104. Interval signal 116 and timing signal 117 are input in pairs. Storage unit 1600 is cleared at the rise of timing signal 117. The result of summing current interval signal 116 and delayed interval signal 1610 is held and 2-interval signal 1612 is calculated at the fall of timing signal 117.

Figure 18:
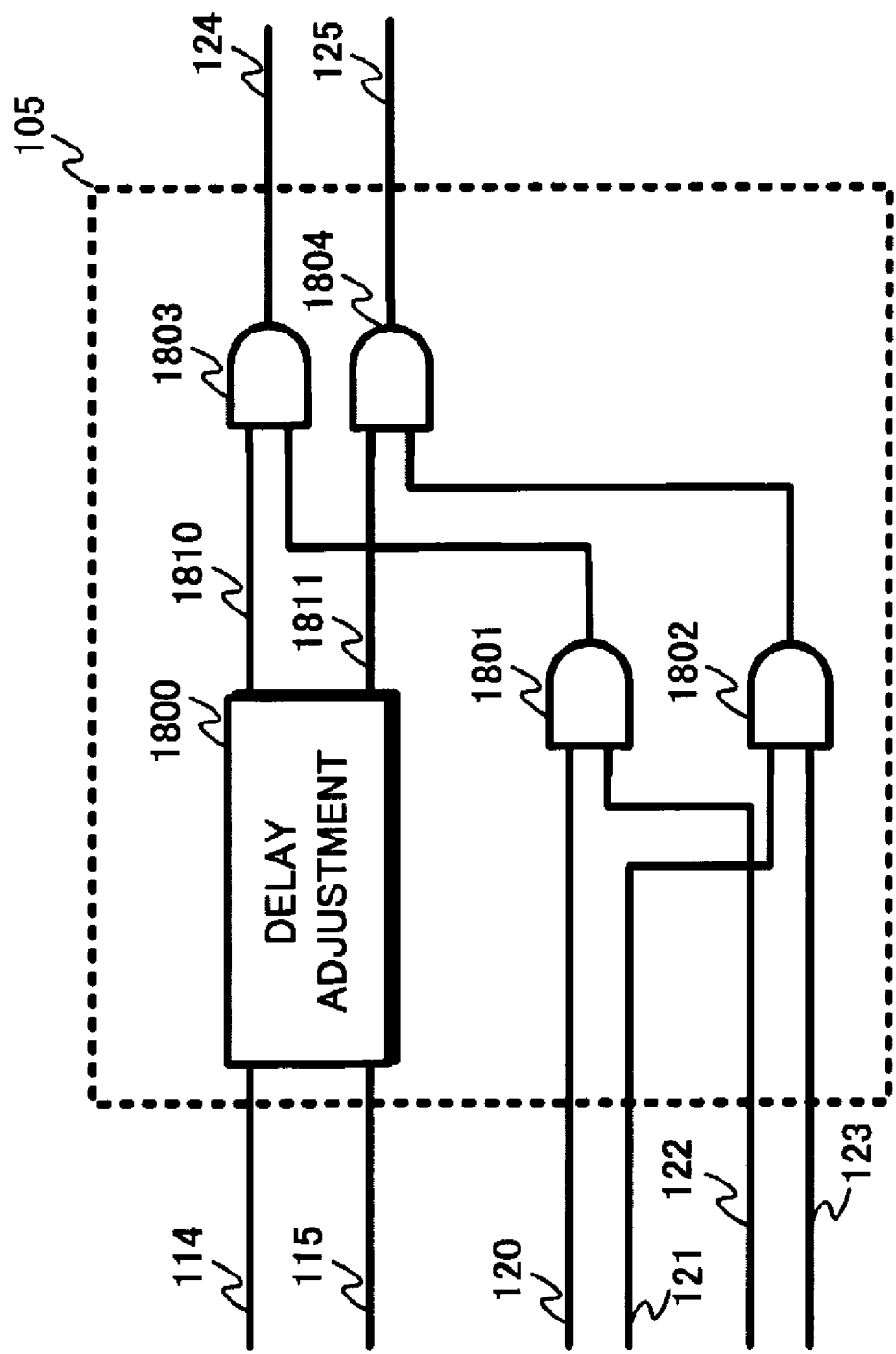
FIG. 18 is a block diagram showing a detailed structure of a control unit 105.

Control unit 105 is shown in detail in FIG. 18. Unit 105 includes a delay adjustment unit 1800, and AND circuits 1801, 1802, 1803 and 1804. Unit 105 performs controls to either validate (high) or invalidate (low) zero-crossing signal 114 based on 1-interval and 2-interval control signals 120 and 122. Delay adjustment unit 1800 delays-zero-crossing signal 114 by a predetermined time period T1set to adjust the timing relation with the 1-interval and 2-interval control signals (i.e. the T1set delay is to allow for circuit delay between the processing of zero-crossing signal 114 and control signals 120 and 122).

Figure 19:
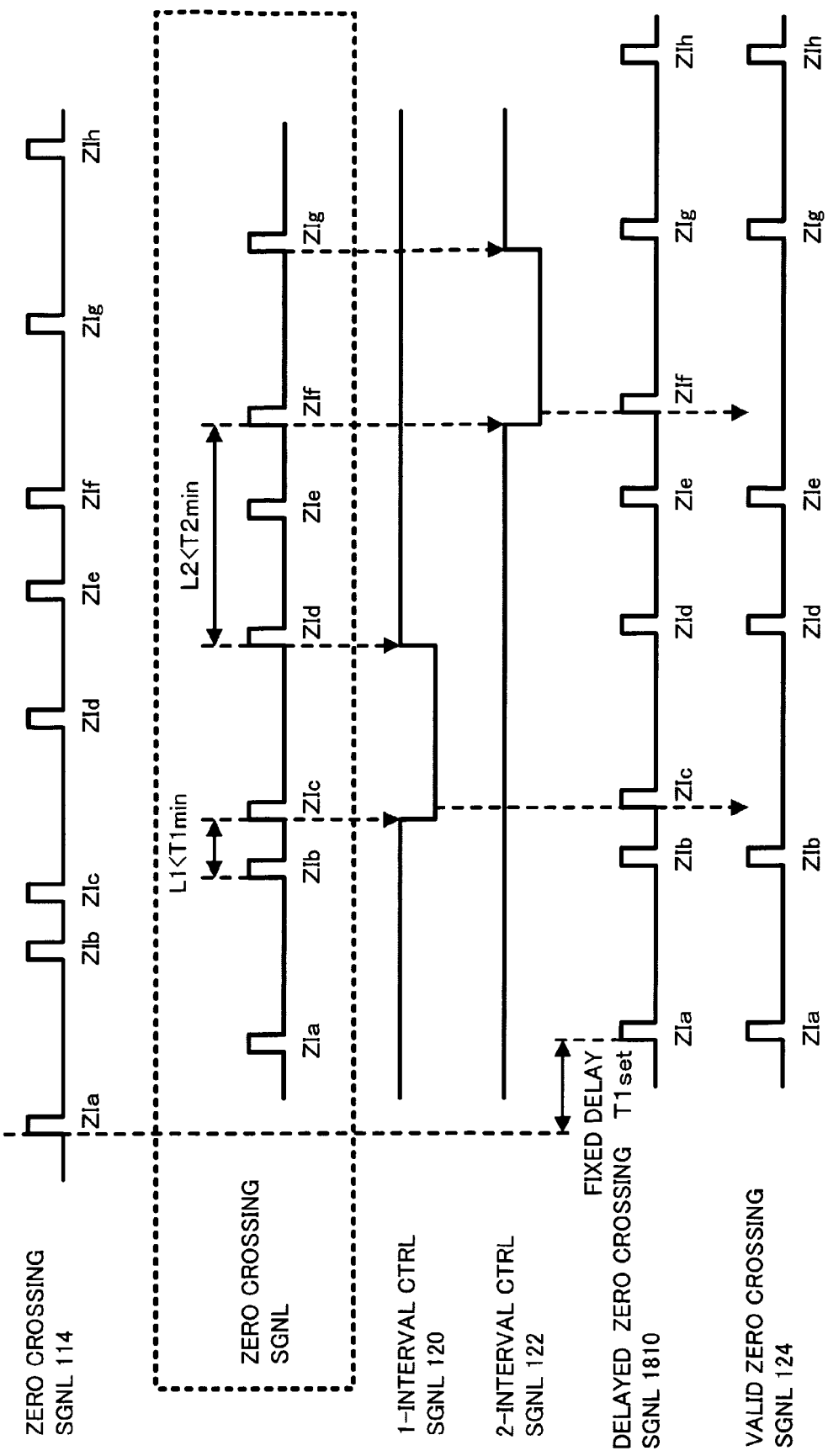
FIG. 19 is a timing chart showing the transition of I-signals in control unit 105.

FIG. 19 is a timing chart showing the transition of I-signals in control unit 105. In FIG. 19, ZIa to ZIh denote zero-crossing signals input to control unit 105. Since the interval L1Ibc (i.e. ZIc to the preceding ZIb) is shorter than T1min, upstream 1-interval judgment unit 103 changes 1-interval control signal 120 to low. Similarly, since the interval L2Idf (i.e. ZIf to the $2^{nd}$ preceding ZId) is shorter than T2min, 2-interval judgment unit 104 changes 2-interval control signal 122 to low. Accordingly, zero-crossing signals ZIc and ZIf are invalidated, since control unit 105 invalidates delayed zero-crossing signal 1810 if either of 1-interval control signal 120 or 2-interval control signal 122 is set to low (invalid). Note that the same processing is also performed on signals relating to the Q-axis.

Thus, control unit 105 only outputs a valid zero-crossing signal 124 at high if both 1-interval and 2-interval control signals are set to high (valid).

Figure 20:
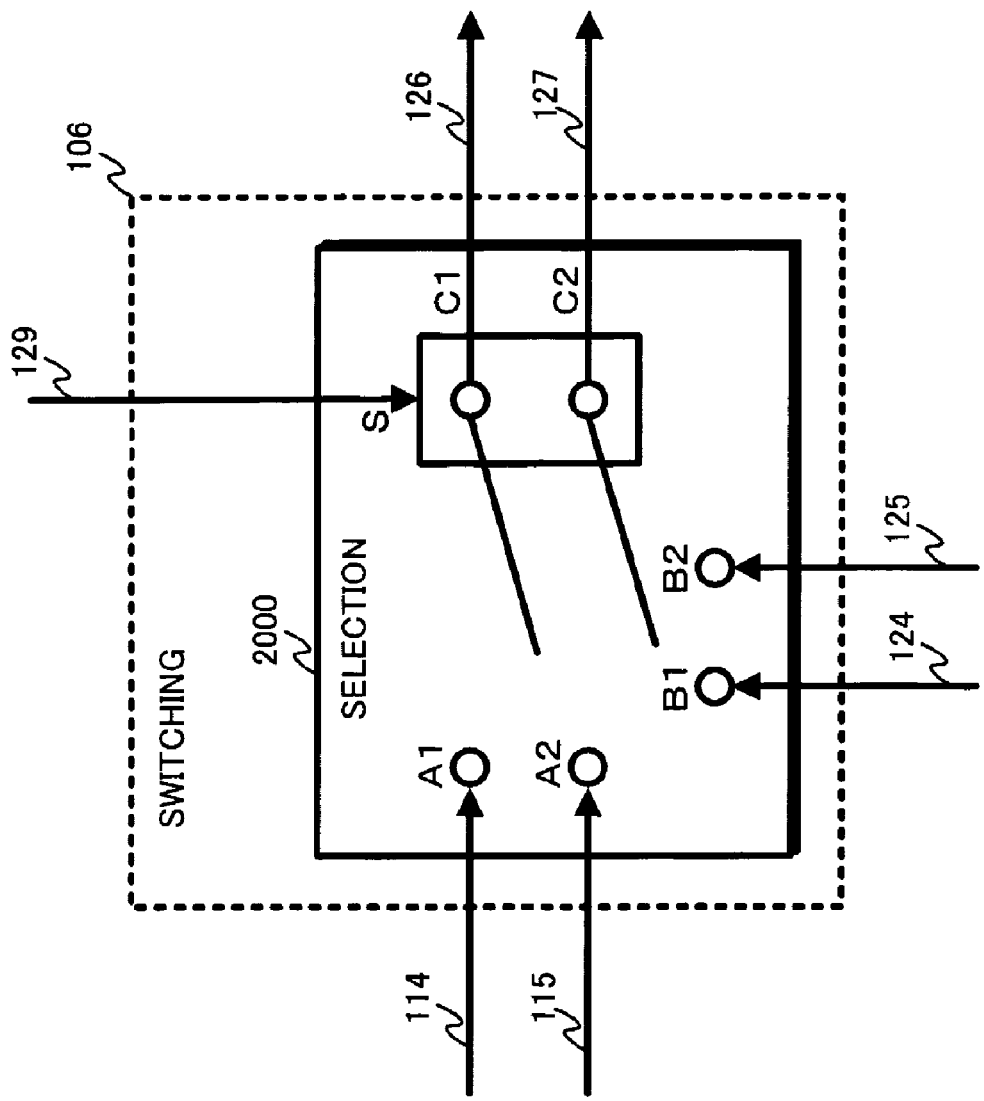
FIGS. 20A & 20B are respectively a block diagram showing a detailed structure of a switching unit 106, and a truth table associating output values with input values.

FIG. 20A is a block diagram showing the structure of switching unit 106. Unit 106 includes a selection circuit 2000, and operates in accordance with the truth table shown in FIG.

20B. Inputs (B1, B2) are selected for outputs (C1, C2) if a control signal S (i.e. frame reception signal 129) is "0" (low), and inputs (A1, A2) are selected if control signal S is "1" (high). During frame reception, selection circuit 2000 outputs valid zero-crossing signal 124 as phase error information 126 if frame reception signal 129 is low (i.e. during reception of PR and UW portions), and outputs zero-crossing signal 114 as phase error information 126 if frame reception signal 129 is high (i.e. after PR and UW portions have been received).

Figure 21:
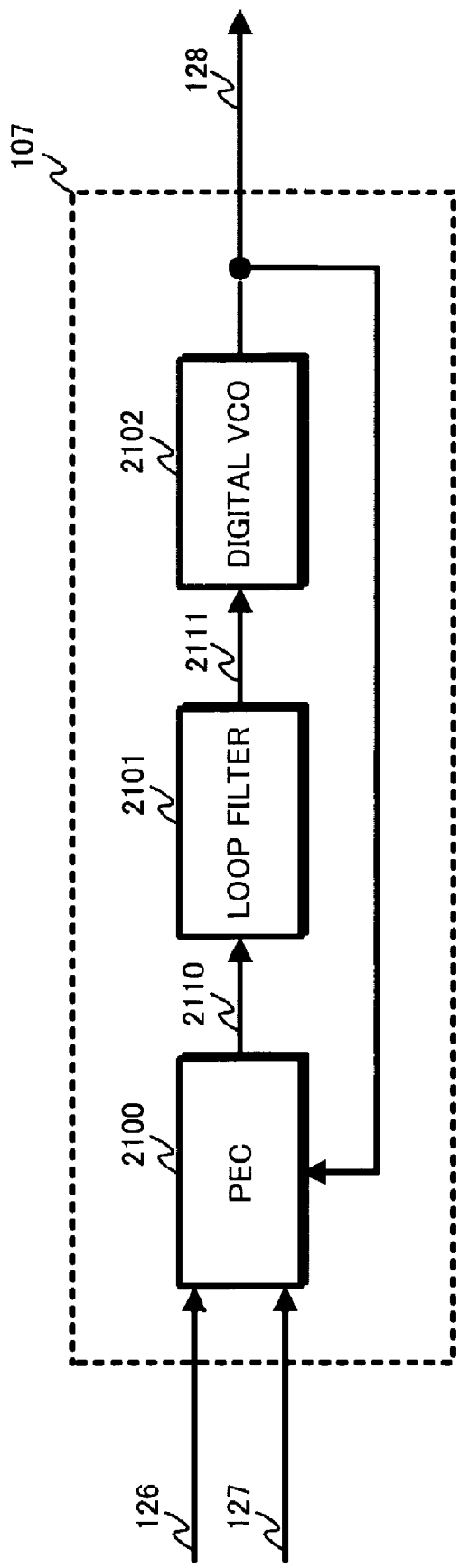
FIG. 21 is a block diagram showing a detailed structure of a clock generation unit 107.

Clock generation unit 107 is shown in detail in FIG. 21. Given that a primary object of the present invention is to provide a technique for effectively sampling phase error information (here, zero-crossing signals), the operations of clock generation unit 107 are discussed only briefly. Unit 107 includes a phase error detection unit 2100, a loop filter 2101, and a digital VCO (voltage controlled oscillator) 2102. Error detection unit 2100 evaluates the phase of inputted phase error information 126 based on the timing of symbol clock 128 output from digital VCO 2102, and outputs the difference between symbol clock 128 and the phase of the phase error information as a phase error signal 2110. Loop filter 2101 smoothes phase error signal 2110, and outputs the smoothed signal as a frequency control value 2111. Digital VCO 2102 generates symbol clock 128 based on frequency control value 2111.

Figure 22:
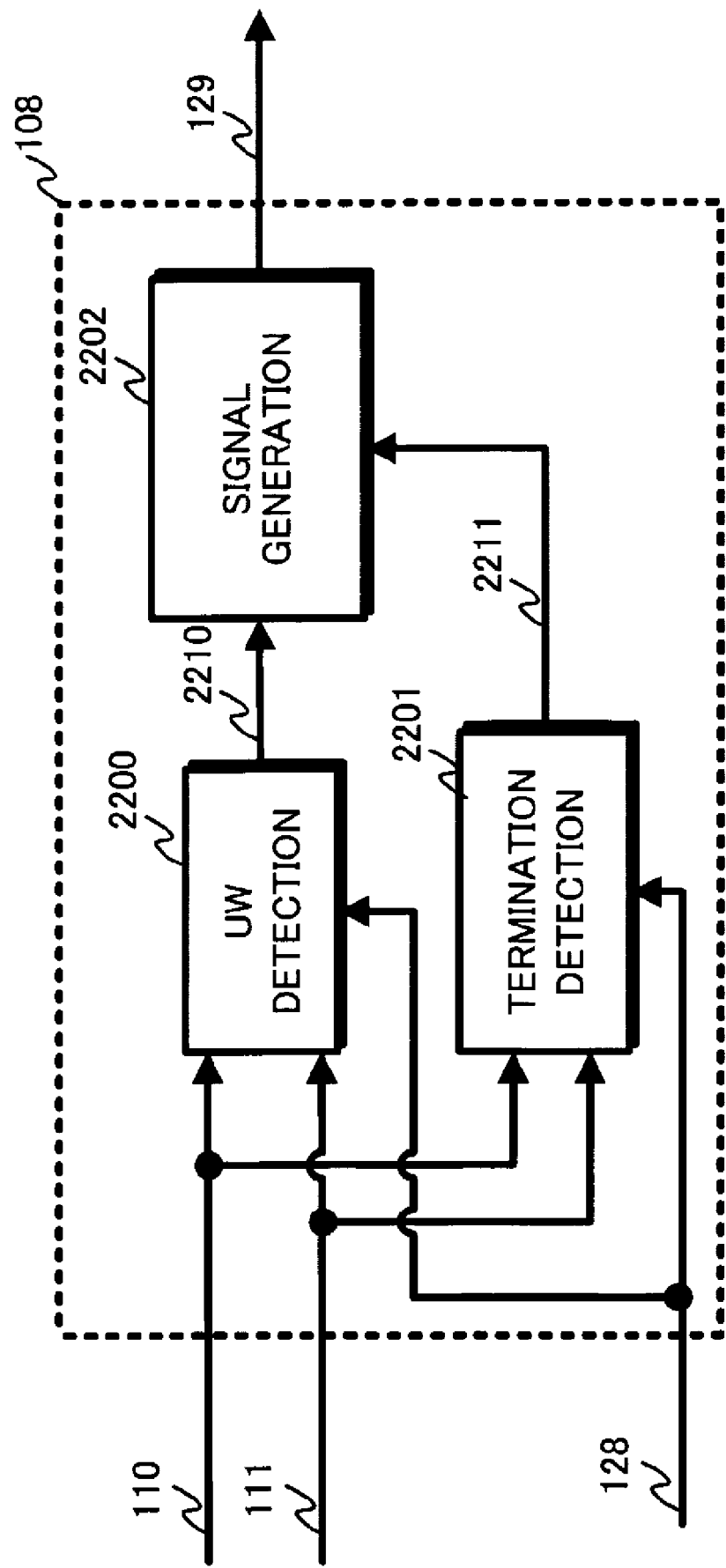
FIG. 22 is a block diagram showing a detailed structure of a frame detection unit 108.

Frame detection unit 108 is shown in detail in FIG. 22. Unit 108 includes a UW detection unit 2200, a frame termination detection unit 2201, and a signal generation unit 2202. UW detection unit 2200 detects the UW based on I/Q phase-corrected signals 110 and 111 (phase-corrected signal 412 in FIG. 4) and symbol clock 128, and outputs a UW signal 2210. Frame termination detection unit 2201 detects the termination of a frame, and outputs a termination signal 2211. Signal generation unit 2202 outputs a frame reception signal 129 set to either "0" (low) or "1" (high), based on UW signal 2210 and termination signal 2211. Frame reception signal 129 shows the state of the frame being received.

Figure 23:
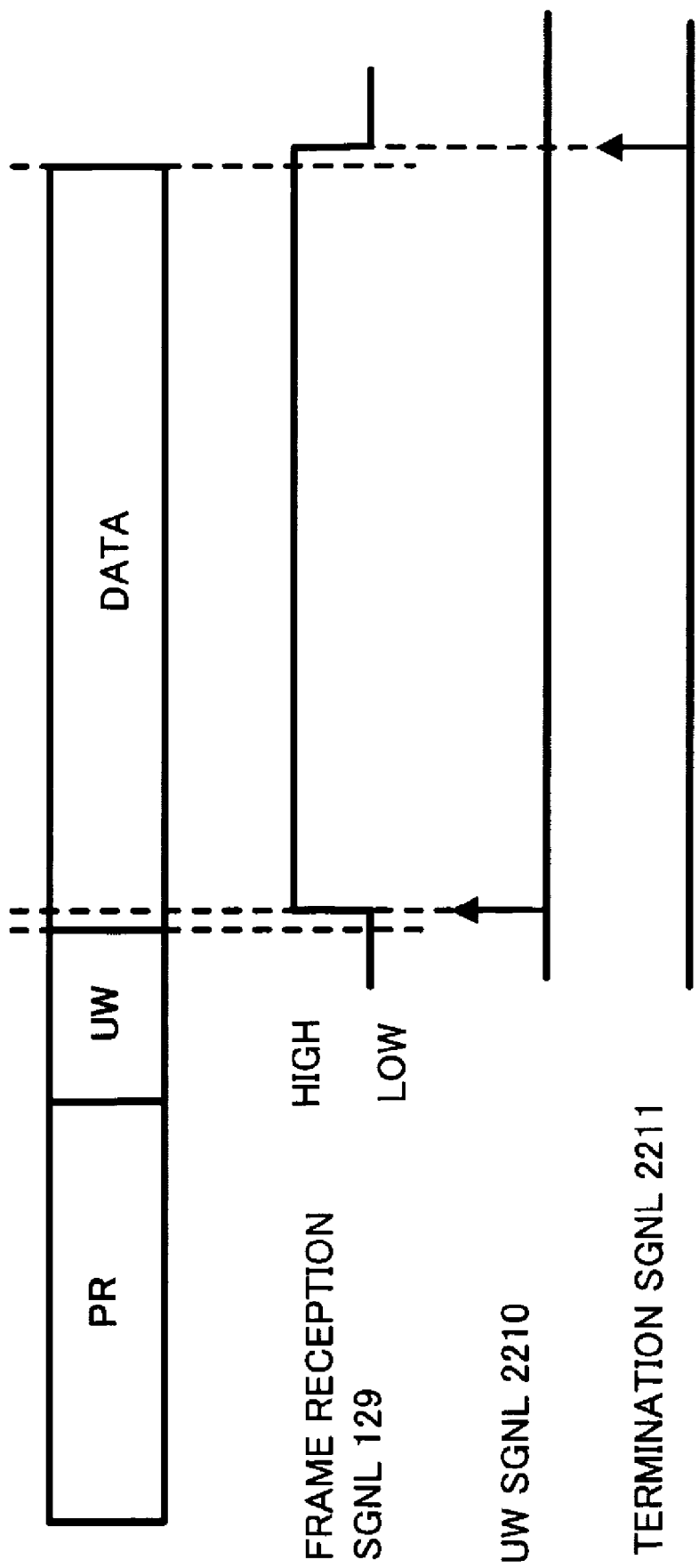
FIG. 23 is a timing chart showing the transition of a frame reception signal 129.

FIG. 23 is a timing chart showing the transition of frame reception signal 129. Frame reception signal 129 is maintained at low for the duration of the PR and UW reception, and is set to high for the duration of data reception after the UW has been detected. Accordingly, switching unit 106 outputs the valid zero-crossing signal from control unit 105 if frame reception signal 129 is low, and outputs the zero-crossing signal from zero-crossing detection unit 101 as phase error information if frame reception signal 129 is high.

As illustrated above, clock recovery circuit 1 pertaining to embodiment 1 not only judges a 1 zero-crossing interval between successive zero crossings, but also separately judges another predetermined zero-crossing interval. In the present embodiment, this other interval is a 2 zero-crossing interval obtained by summing two successive single intervals. If the 1 and 2 zero-crossing intervals are both within respective ranges, clock recovery circuit 1 validates the zero-crossing signals. In other words, a feature of the present invention is being able to achieve fast phase locking in clock recovery at the head of each burst by designating only apparently reliable eyes as phase error information.

Clock recovery circuit 1 is able to lock the clock phase even if phase-corrected signal 412 includes phase shift at the stage at which PEC circuit 402 locks correction values at the head of a frame. Once clock recovery circuit 1 has locked the phase of symbol clock 128, PEC circuit 402 is able to correct phase shift using an accurate correction value. Accordingly, clock recovery from the UW onward is performed using phase-corrected signal 412, allowing both clock recovery circuit 1 and PEC circuit 402 to operate stably.

Next, a received π/4 DQPSK signal that includes frequency shift and noise is taken as an example to illustrate the specific operations of clock recovery circuit 1.

Figure 24:
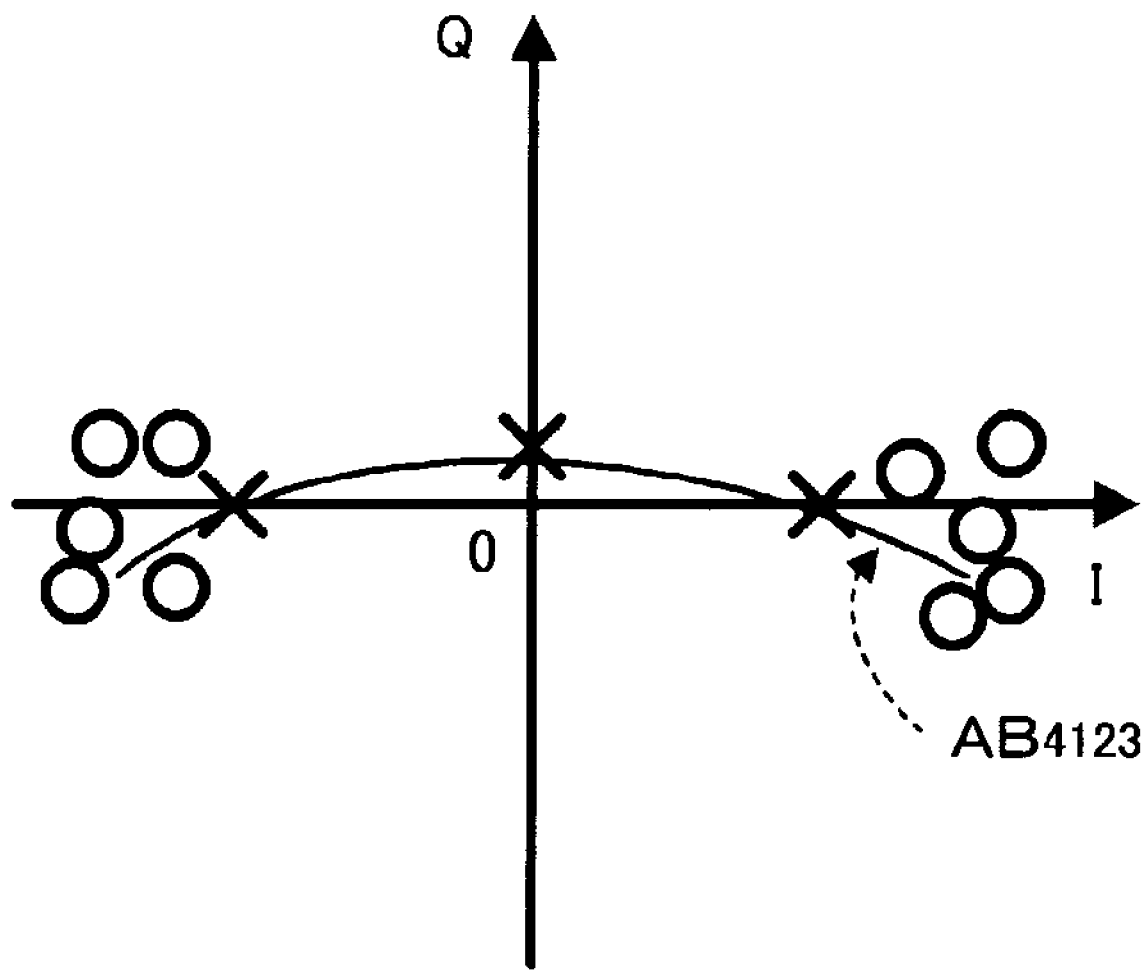
FIG. 24 is a schematic diagram showing the transition of a detected π/4 DQPSK signal that includes +45° phase shift and noise when an alternating pattern.

FIG. 24 shows the transition of a detected π/4 DQPSK signal that includes +45° phase shift and noise when the alternating pattern. The signal input to signal detection unit 401 is a digital signal sampled at 12 samples per symbol. The input signal is expressed as $$S(n) = I(n) + j \cdot Q(n) \quad (2)$$

where I(n) is the I-component, Q(n) is the Q-component, and n is a positive integer that includes zero.

Detection unit 401 differentially detects a 1-symbol delayed signal. The output D(n) is expressed as $$D(n) = \{I(n) + j \cdot Q(n)\} \cdot \{I(n-12) + j \cdot Q(n-12)\}^* \quad (3)$$

where n is an integer of 12 or greater, and * indicates a complex conjugate.

PEC circuit 402 corrects the phase of output D(n), and the resultant signal is input to clock recovery circuit 1. Phase-corrected I/Q signals 112 and 113 are input to zero-crossing detection unit 101, which evaluates changes in the sign of input signals 112 and 113 between samples, and outputs I/Q zero-crossing signals 114 and 115. If there has been a change in sign, zero-crossing signals 114 and 115 are set to high for one sample.

Figure 25:
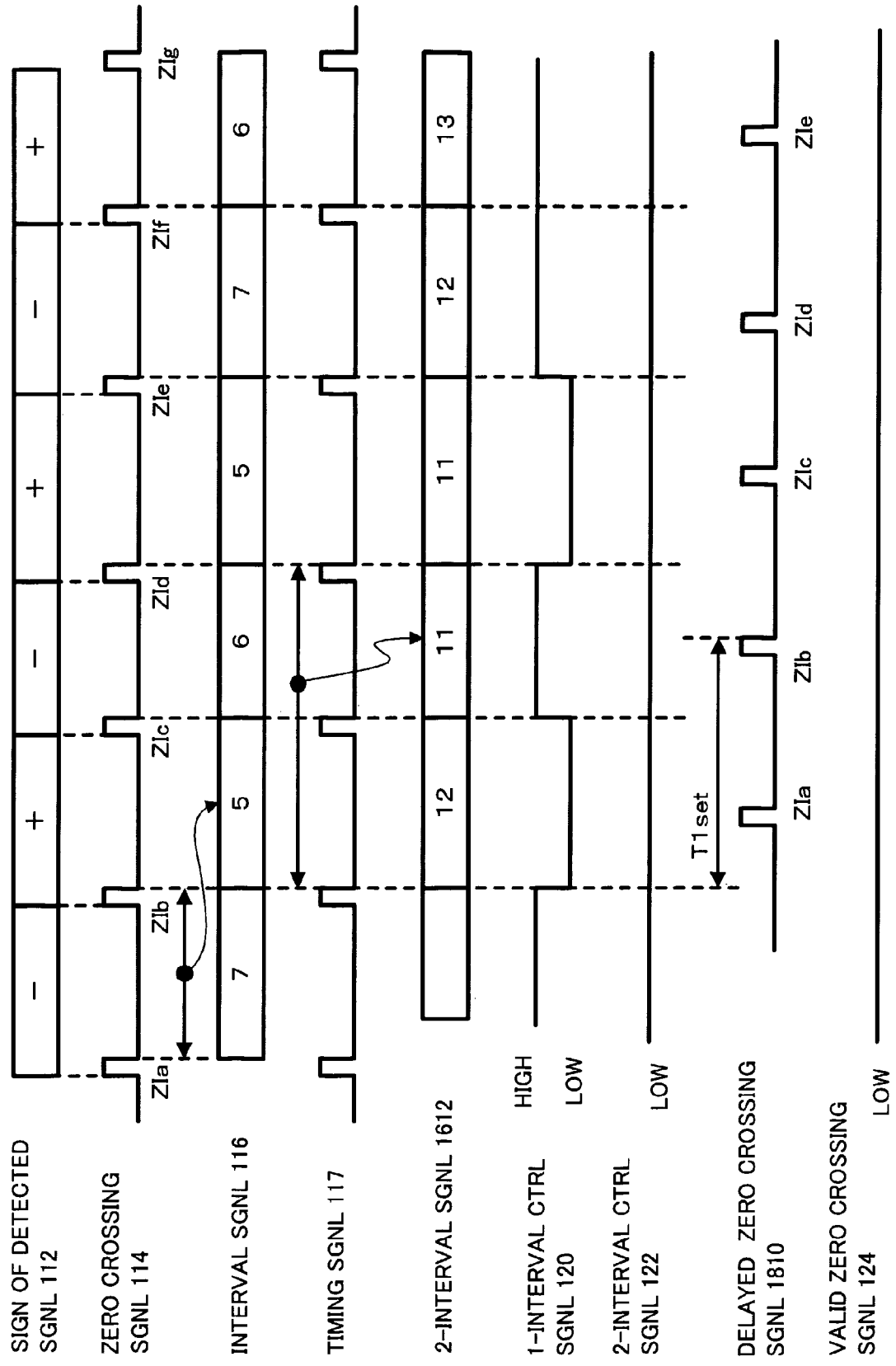
FIG. 25 shows part of a timing chart of signals relating to the I-component of a detected signal that includes +45° phase shift and noise.

FIG. 25 shows part of a timing chart of signals relating to the I-component of a detected signal that includes +45° phase shift and noise.

In FIG. 25, the temporal positions of zero-crossing signals 114 are ZIa, ZIb, ZIc, ZId, ZIe, ZIf and ZIg, from least to most recent. Interval detection unit 102 counts the sample interval between zero-crossing signals 114. In FIG. 25, sample interval L1Iab (ZIa to ZIb) is shown to be 5 samples. 1-interval judgment unit 103 judges whether interval signal 116 is within a predetermined range defined by T1min and T1max.

Here, noise causes the zero-crossing signals to fluctuate around a one-symbol interval in the case of frequency shift being absent. Accordingly, T1min and T1max need to be set with the effects of noise in mind. Here, T1min and T1max are set respectively to 0.5 T (=6 samples) and 1.5 T (=18 samples), where T=1 symbol period.

Accordingly, 1-interval judgment unit 103 validates intervals L1Ibc (ZIb to ZIc=6), L1Ide (ZId to ZIe=7), and L1Ief (ZIe to ZIf=6) having a sample count of 6 to 18 samples, and outputs 1-interval control signals 120 at high (valid). On the other hand, 1-interval judgment unit 103 invalidates the intervals L1Iab (ZIa to ZIb=5) and L1Icd (ZIc to ZId=5) outside the prescribed range, and outputs 1-interval control signals 120 at low (invalid).

Interval signal 116 is also input to 2-interval judgment unit 104. As shown FIG. 16, storage unit 1600 in 2-interval judgment unit 104 stores interval signal 116 every time timing signal 117 is input from interval detection unit 102. Adder 1602 sums the current interval signal 116 and the value (i.e. preceding interval signal 1610) stored in storage unit 1600 to obtain 2-interval signal 1612. This results in intervals L2Iac=11 (L1Iab+L1Ibc=5+6), L2Ibd=11 (L1Ibc+L1Icd=6+5), L2Ice=12 (L1Icd+L1Ide=5+7), and L2Idf=13 (L1Ide+L1Ief=7+6), as shown in FIG. 25. Judgment unit 1604 judges whether these 2-interval signals 1612 are within a predetermined range defined by T2min and T2max.

Given the alternating pattern of the PR, ideally two zero crossings occur every two symbol cycles. In the presence of phase shift, however, the cyclicity of zero-crossing signals along the axis with reduced amplitude fluctuation is disrupted (I-axis in FIG. 24), possibly causing multiple zero crossings per symbol period. On the other hand, zero-crossing signals along the axis with increased amplitude fluctuation (Q-axis in FIG. 24) occur at a rate of one per symbol period, and noise-induced variance is reduced. Accordingly, phase error information can be effectively sampled from zero crossings along the I/Q axes by setting T2min and T2max so as to validate zero-crossing signals that occur at a rate of two every two cycles, and invalidate zero-crossing signals that occur out of the one symbol cycle. In view of this, T2min and T2max are here set respectively to 18 (T×1.5=12×1.5) and 30 (T×2.5=12×2.5) samples.

Since 2-interval signals 1612 in FIG. 25 are all less than 18 samples, 2-interval control signals 122 are output at low (invalid). Accordingly, delayed zero-crossing signals 1810 are all invalidated, and valid zero-crossing signals 124 remain at low.

Thus, even when 1-interval judgment unit 103 judges a short interval between two successive zero crossings in the alternating pattern to be valid (i.e. within the range T1min-T1max), 2-interval judgment unit 104 judges with respect to a combination of two adjacent intervals, and invalidates this 2 zero-crossing interval if less than T2min. Valid eyes are thus selected most accurately, enabling valid phase error information to be obtained.

Q-axis zero crossings are similarly discussed next.

Figure 26:
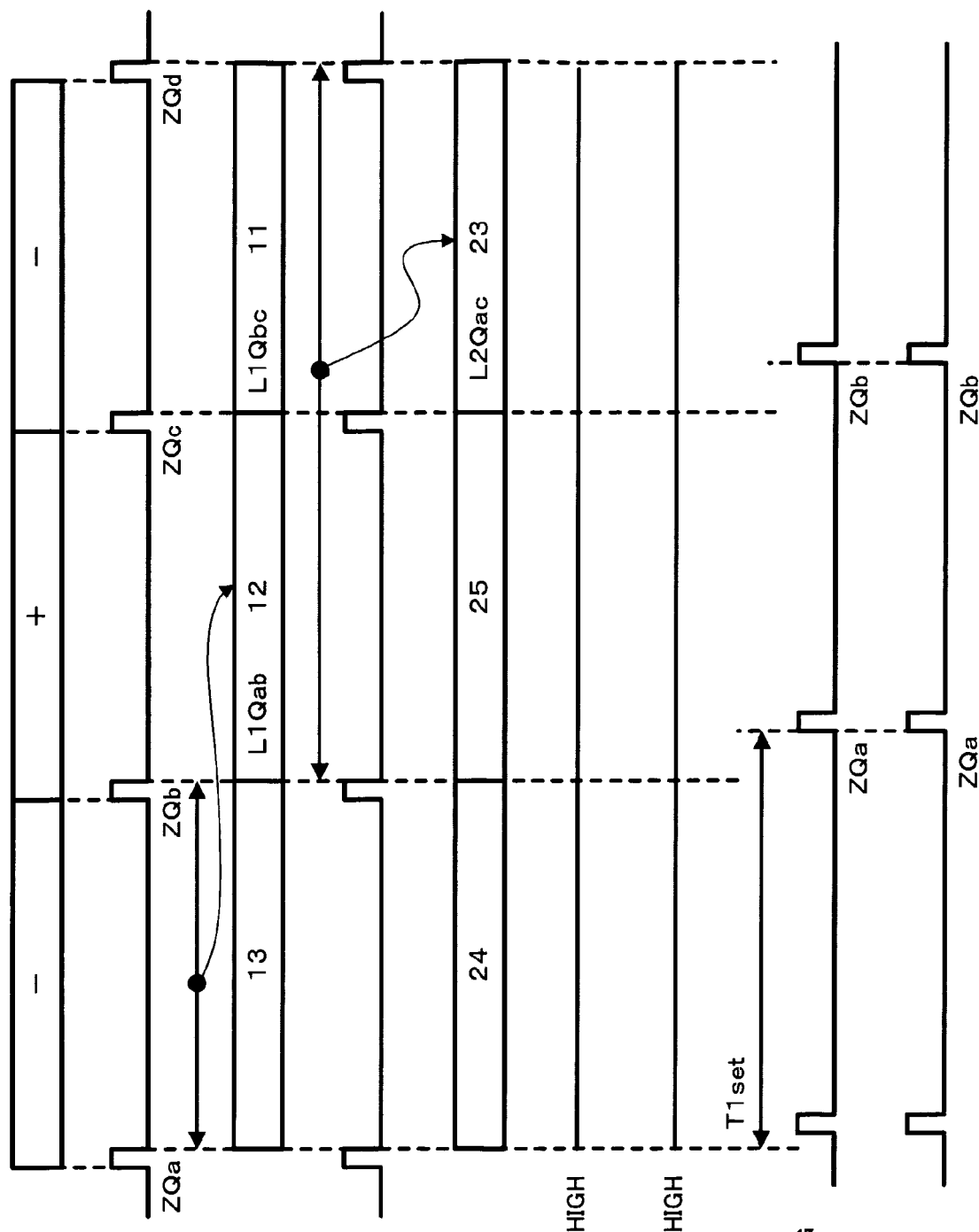
FIG. 26 shows part of a timing chart of signals relating to the Q-component of a detected signal that includes +45° phase shift and noise.

FIG. 26 shows part of a timing chart of signals relating to the Q-component of a detected signal that includes +45° phase shift and noise. In FIG. 26, the temporal positions of zero-crossing signals 115 are shown as ZQa, ZQb, ZQc and ZQd. Interval detection unit 102 counts the sample interval between zero-crossing signals 115. In FIG. 26, sample intervals L1Qab (ZQa to ZQb) and L1Qbc (ZQb to ZQc) are shown to be 12 and 11 samples, respectively. 1-interval judgment unit 103 judges whether interval signal 118 is within the predetermined range defined by T1min (6 samples) and T1max (18 samples). Accordingly, 1-interval judgment unit 103 validates all of interval signals 118 in FIG. 26 (i.e. all between 6 and 18 samples), and outputs all 1-interval control signals 121 at high (valid).

Interval signal 118 is also input to 2-interval judgment unit 104. Similarly to the I-component, storage unit 1601 in 2-interval judgment unit 104 shown in FIG. 16 stores interval signal 118 every time timing signal 119 is input from interval detection unit 102. Adder 1603 sums the current interval signal 118 and the value (i.e. preceding interval signal 1611) stored in storage unit 1601 to obtain 2-interval signal 1613. This results in intervals L2Qac=23 (i.e. L1Qab+L1Qbc=12+11), as shown in FIG. 26. Judgment unit 1605 judges whether these intervals are within the predetermined range defined by T2min (18 samples) and T2max (30 samples). Since 2-interval signals 1613 in FIG. 26 are all between 18 and 30 samples, 2-interval control signals 123 are output at high (valid). Accordingly, delayed zero-crossing signals 1811 are all validated and output as valid zero-crossing signals 125.

Since receiver 4 has yet to receive the UW portion at the stage that the PR portion is received, frame detection unit 108 outputs frame reception signal 129 at low. Accordingly, switching unit 106 selects the I/Q valid zero-crossing signals 124 and 125 from control unit 105, and outputs the selected signals to clock generation unit 107 as I/Q phase error information 126 and 127. Once receiver 4 has finished receiving the UW portion, frame reception signal 129 changes to high (i.e. indicates that data is being received), and switching unit 106 switches to outputting I/Q zero-crossing signals 114 and 115 from zero-crossing detection unit 101 as I/Q phase error information 126 and 127. Clock generation unit 107 adjusts the clock phase and the generated clock is input to PEC circuit 402, enabling correct phase correction values to be derived.

As illustrated above, clock recovery circuit 1 pertaining to the present embodiment is able to validate the Q-component (115) of zero-crossing signals occurring within the symbol cycle, while invalidating the I-component (114) of zero-crossing signals occurring outside of the symbol cycle, at an early stage during reception of a frame signal that includes frequency shift, thereby allowing for faster phase locking of the symbol clock at the head of each burst. While the above description illustrates the case of +45° phase shift, it should be noted that similar effects are obtained in the case of −45° phase shift, since clock recovery circuit 1 similarly validates the I-component (114) of zero-crossing signals occurring within the symbol cycle, while invalidating the Q-component (115) of zero-crossing signals occurring outside of the symbol cycle. Also, since clock recovery circuit 1 can lock the clock phase even when the detected signal includes frequency shift, PEC circuit 402 is able to correctly derive phase correction values.

Embodiment 2

Figure 27:
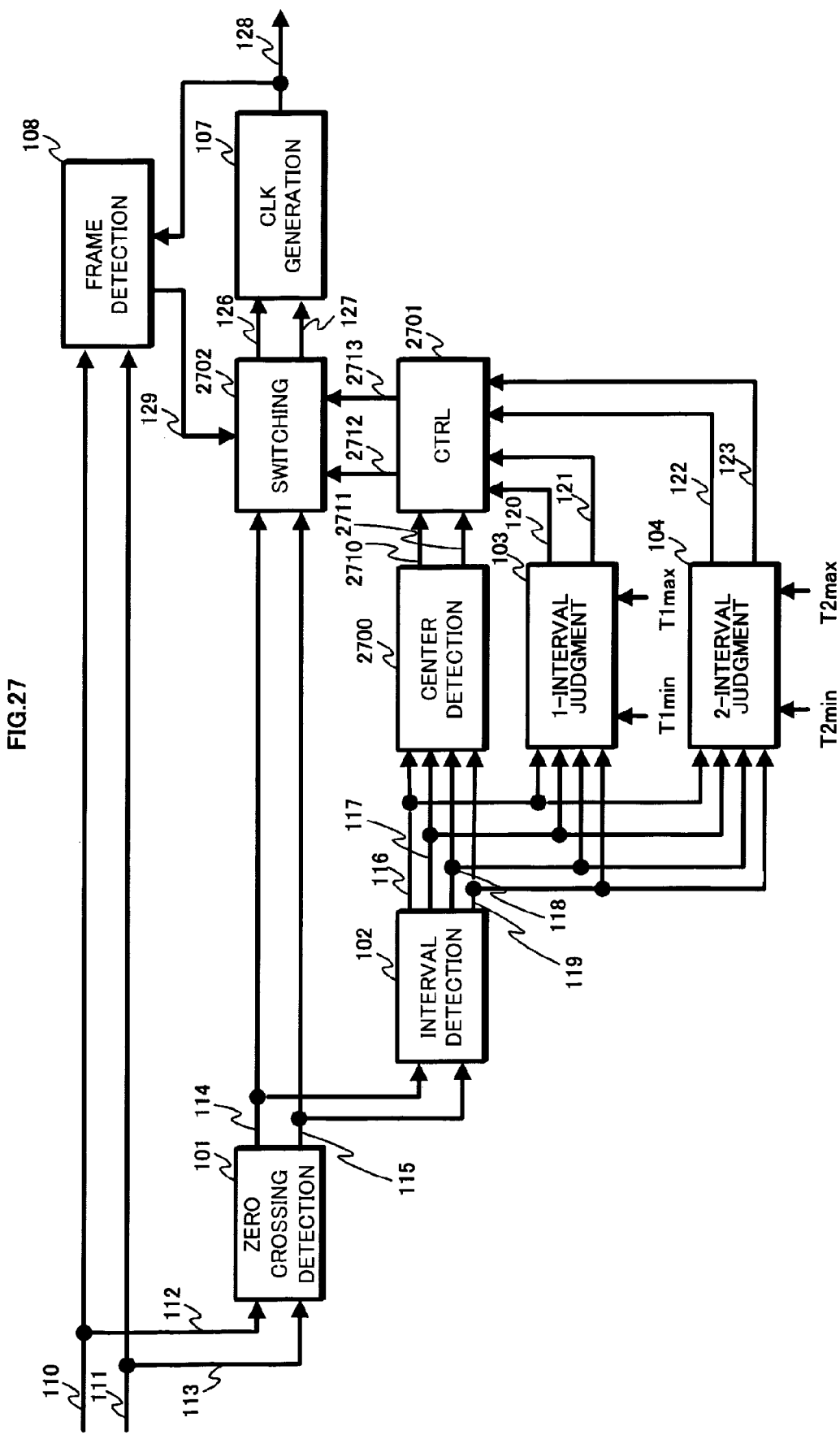
FIG. 27 is a block diagram showing the structure of a clock recovery circuit 27 pertaining to an embodiment 2 of the present invention.

FIG. 27 is a block diagram showing the structure of a clock recovery circuit pertaining to an embodiment 2 of the present invention. Clock recovery circuit 27 includes a zero-crossing detection unit 101, an interval detection unit 102, a center detection unit 2700, a 1-interval judgment unit 103, a 2-interval judgment unit 104, a control unit 2701, a switching unit 2702, a clock generation unit 107, and a frame detection unit 108.

Figure 28:
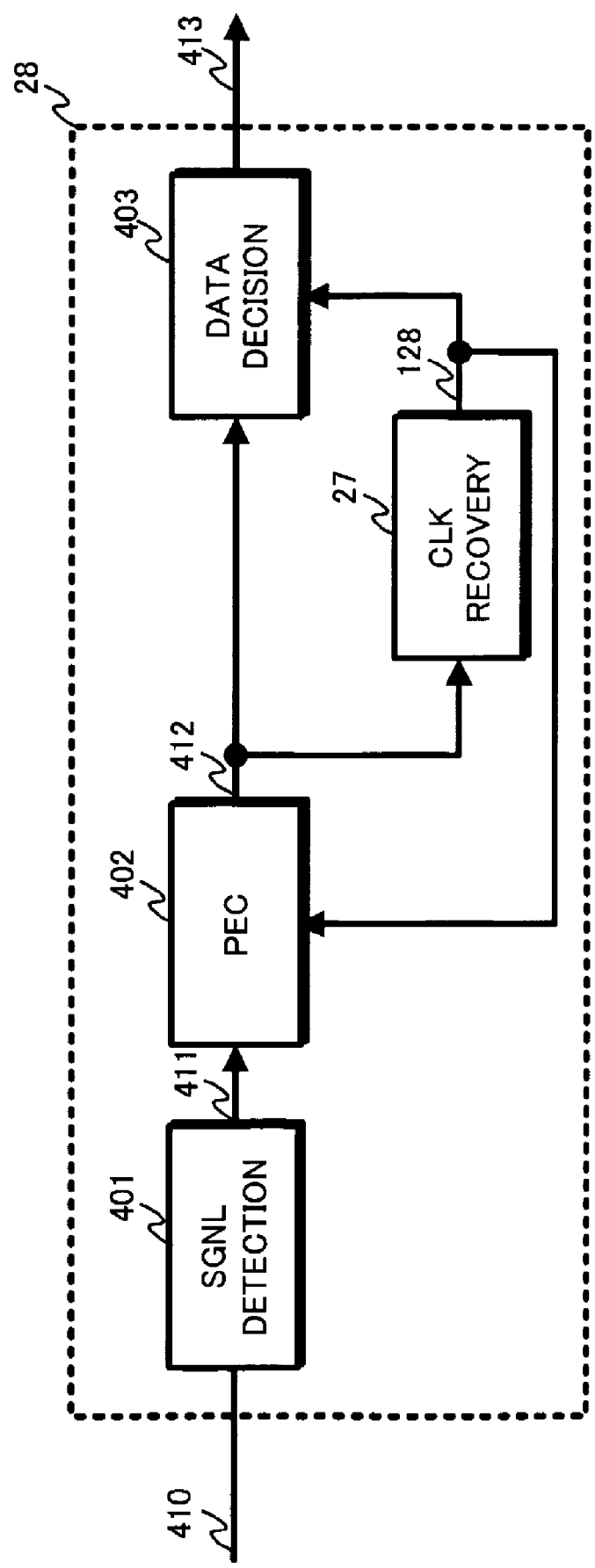
FIG. 28 is a block diagram showing the structure of a receiver 28 that includes clock recovery signal 27.

FIG. 28 is a block diagram showing the structure of a receiver 28 that includes clock recovery circuit 27. Apart from circuit 27, receiver 28 adopts a similar structure to receiver 4 pertaining to embodiment 1 shown in FIG. 4. Circuit 27 shares with circuit 1 the fact that the circuit is built into the receiver, that phase-corrected signal 412 has the frame structure shown in FIG. 2, that the PR sequence of received signal 410 is an alternating pattern, and that zero-crossing signals are switched on the basis of frame reception signal 129. Given that zero-crossing detection unit 101, interval detection unit 102, 1-interval judgment unit 103, 2-interval judgment unit 104, clock generation unit 107 and frame detection unit 108 have the same structure and perform the same operations as in embodiment 1, the same reference signs are appended and description is omitted here.

Clock recovery circuit 27 derives the temporal position of a center between adjacent zero crossings, generates a center signal at the derived temporal position, and decides whether to validate or invalidate the center signal based on the interval between zero-crossing signals. A feature of circuit 27 is that only center signals validated by control unit 2701 are used as valid center signals for generating phase error information. This enables phase error information to be generated within the symbol cycle even when the duty ratio of adjacent zero crossing intervals in the alternating pattern varies greatly.

Focusing on the differences with embodiment 1, a detailed description of center detection unit 2700 and control unit 2701 is given here. Note that to assist comprehension, the following description, as in embodiment 1, refers only to the I-component of phase-corrected signals input to clock recovery circuit 27, given that the Q-component is processed similarly.

Figure 29:
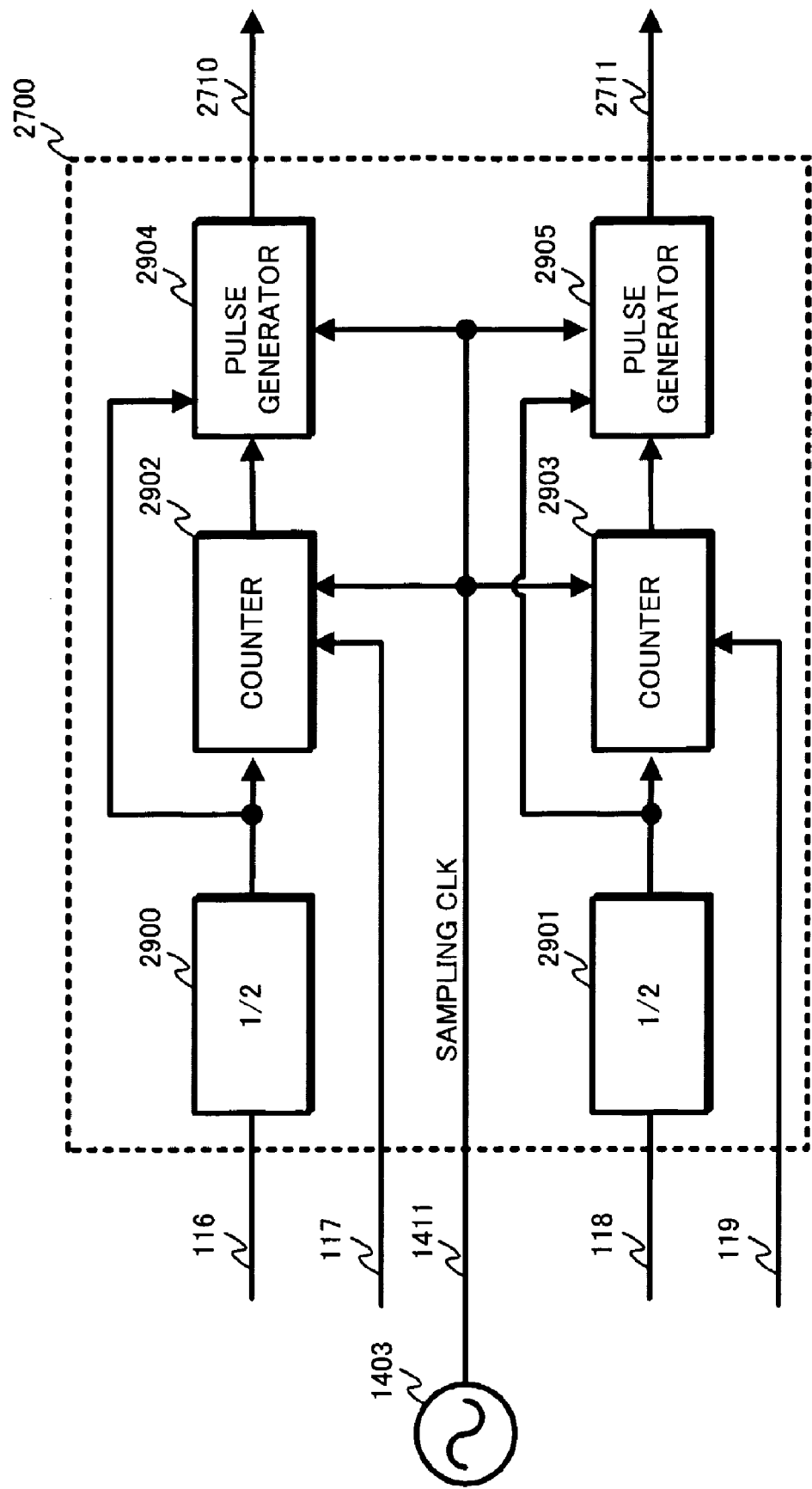
FIG. 29 is a block diagram showing a detailed structure of a center detection unit 2700.

FIG. 29 is a block diagram showing a detailed structure of center detection unit 2700. Unit 2700 is structured as circuitry that includes 1/2 circuits 2900 and 2901, counters 2902 and 2903, and pulse generators 2904 and 2905. 1/2 circuit 2900 receives input of interval signal 116, derives a 1/2 value of the time interval shown by interval signal 116, and outputs the derived 1/2 value to counter 2902 as a setting signal. Counter 2902 receives input of timing signal 117 as a reset signal and, having set the value derived in 1/2 circuit 2900, counts a sampling clock 1411 generated by a sampling clock generator 1403 until the next resetting. Pulse generator 2904 generates a pulse immediately before the resetting, and outputs the pulse as center signal 2710.

Figure 30:
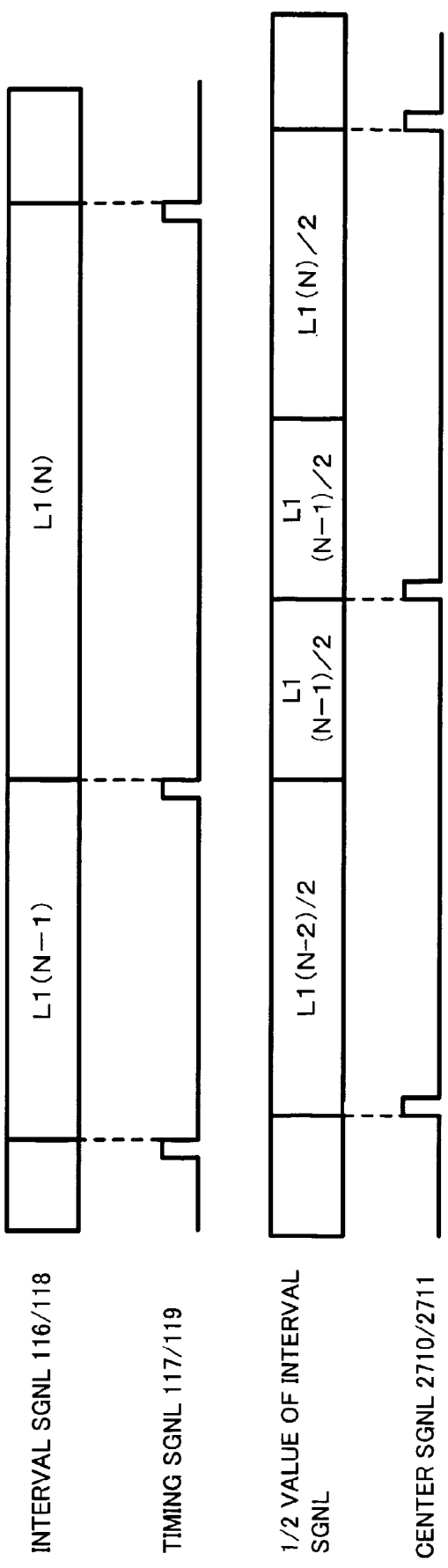
FIG. 30 is a timing chart showing the change in signals in center detection unit 2700.

FIG. 30 is a timing chart showing the change in signals in center detection unit 2700. Counter 2902 is reset by interval timing signal 117, sets the 1/2 value (i.e. L1/2) of the zero-crossing interval, and counts sampling clock 1411 generated by sampling clock generator 1403. When the counter value reaches the L1/2 value, pulse generator 2904 generates a 1-sample pulse, and outputs the pulse as center signal 2710.

Figure 31:
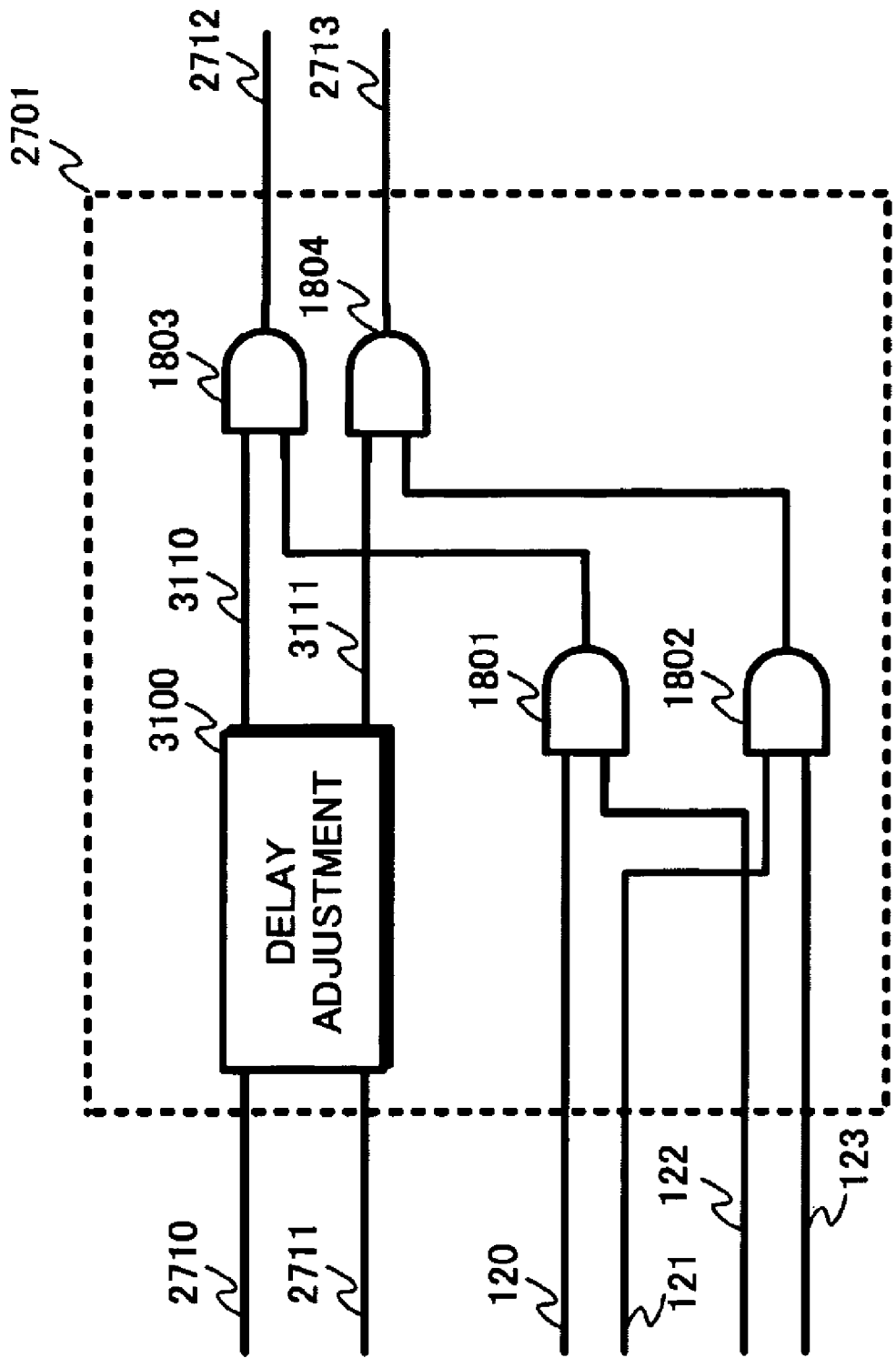
FIG. 31 is a block diagram showing a detailed structure of a control unit 2701.

FIG. 31 is a block diagram showing a detailed structure of a control unit 2701. Unit 2701 includes a delay adjustment unit 3100, and AND circuits 1801, 1802, 1803 and 1804. When 1-interval and 2-interval control signals 120 and 122 are both set to high (valid), control unit 2701 validates center signal 2710, and outputs a valid center signal 2712.

Figure 32:
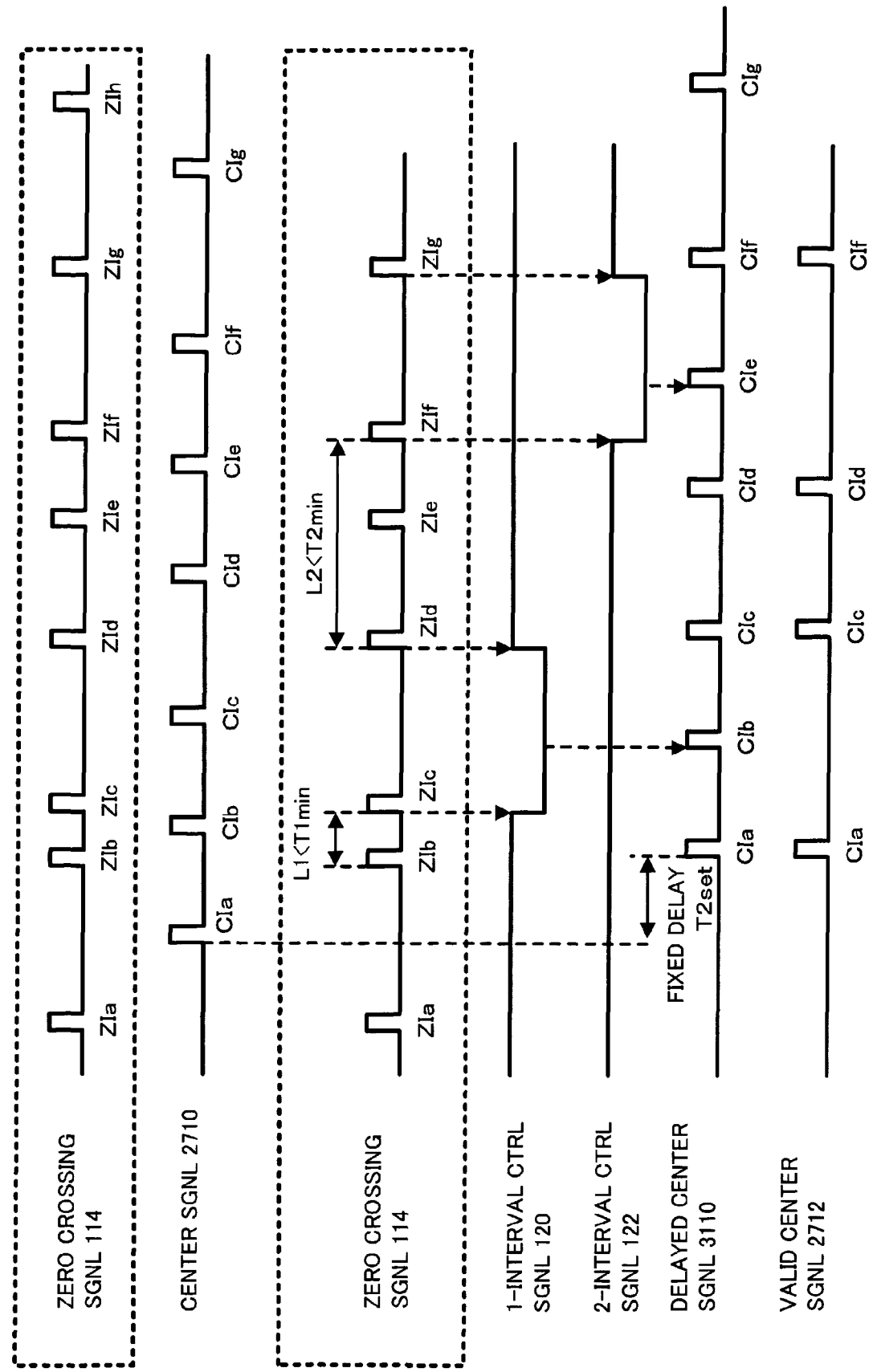
FIG. 32 is a timing chart showing the change in signals relating to the I-component in control unit 2701.

FIG. 32 is a timing chart showing the change in signals relating to the I-component in control unit 2701.

Zero-crossing signal 114, which forms the basis of center signal 2710 and interval control signals 120 and 122, is also shown in FIG. 32. When 1-interval and 2-interval control signals 120 and 122 are both set to low (invalid), control unit 2701 invalidates center signal 2710 (low). In FIG. 32, valid center signals 1712 are output with center signals CIb and CIe having been invalidated. Note that to absorb the processing delay (i.e. circuit delay) difference between center signal 2710 and control signals 120 and 122, delay adjustment unit 3100 delays center signal 2710 by a fixed delay T2set.

As described above, clock recovery circuit 27 pertaining to the present embodiment generates a center signal at the temporal position of the center between adjacent zero-crossing signals, and outputs the center signal as phase error information during PR reception, and then during data reception after the UW has been received, circuit 27 switches to outputting the zero-crossing signals as phase error information, based on frame reception signal 129.

An example of the specific operations of clock recovery circuit 27 pertaining to embodiment 2 of the present invention is illustrated next. The reception of a PSK-VP (see Japanese Patent No. 2506748) signal is described.

PSK-VP (phase shift keying with varied phase) modulation exhibits excellent reception characteristics in a multipath fading environment. By adding redundancy to the phase transition within a symbol period, the eye opens enabling demodulation without relying on the multipath fading environment, even when the delay amount of delayed waves relative to precursors exceeds T/2 relative to a symbol period T.

Here, investigations are carried out using QPSK-VP (hereinafter, π/4 DQPSK-VP) modulation in accordance with the quadrature differential encoding rule shown in FIG. 5. In π/4 DQPSK-VP modulation, the transition of the detected signal is arc-shaped, as in the π/4 DQPSK modulation of embodiment 1, with this phenomenon being particularly marked in a multipath environment. A two-wave model is assumed as the multipath environment.

Figure 33:
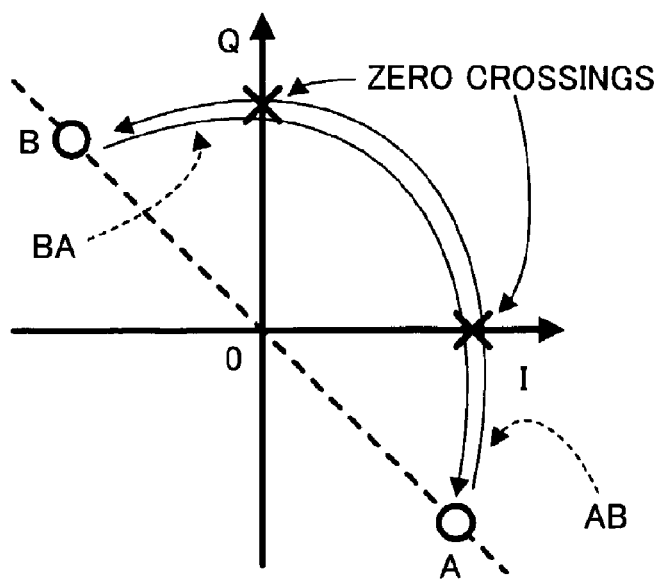
FIG. 33 is a schematic diagram showing the transition of a detected π/4 DQPSK-VP signal in a two-wave environment when an alternating pattern.

FIG. 33 shows the transition of a detected π/4 DQPSK-VP signal in a two-wave environment when the alternating pattern. Note that the example assumes first and second waves of uniform power, with the second wave being delayed by T/2 symbols. Phase shift and noise are absent. The signal transits between the symbols in the same direction relative to the alternating axis, forming a wide arc that does not pass through the origin.

An example in which noise and phase shift caused by frequency shift are included in the signal is discussed next.

Given that in the case of ±45° phase shift, the signal transition in FIG. 33 is arc-shaped similar to the π/4 DQPSK signal transition in FIG. 6, clock recovery circuit 27 pertaining to the present embodiment is able to achieve the same effects obtained by the sampling of phase error information using 1 and 2 interval judgment units 103 and 104 discussed in embodiment 1. Accordingly, the case of +20° phase shift is described here.

Figure 34:
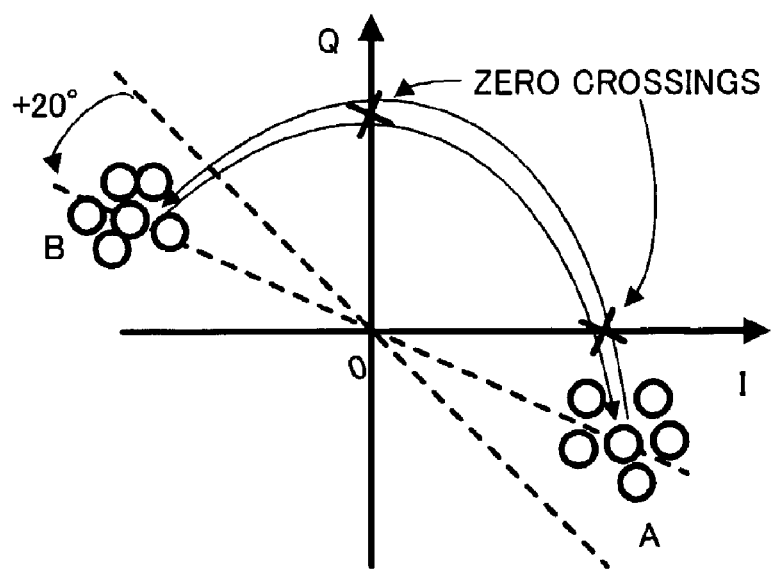
FIG. 34 is a schematic diagram showing the transition of a detected π/4 DQPSK-VP signal that includes +20° phase shift and noise in a two-wave environment when an alternating pattern.

FIG. 34 shows the transition of a detected π/4 DQPSK-VP signal that includes +20° phase shift and noise in a two-wave environment when the alternating pattern.

Here, received signal 410 input to detection unit 401 is assumed to be digital signal sampled at 16 samples per symbol.

Input signal 410 is expressed as $$S(n) = I2(n) + j \cdot Q2(n) \qquad (4)$$

where I2($n$) is the I-component, Q2($n$) is the Q-component, and n is a positive integer.

Detection unit 401 differentially detects a 1-symbol delayed signal. The output D2($n$) is expressed as $$D2(n) = \{I2(n) + j \cdot Q2(n)\} \cdot \{I2(n-16) + j \cdot Q2(n-16)\}^* \qquad (5)$$

where n is an integer of 16 or greater.

PEC circuit 402 corrects the phase of output D2($n$), and the resultant signal is input to clock recovery circuit 27. Phase-corrected I/Q signals 112 and 113 are input to zero-crossing detection unit 101, which evaluates changes in the sign of input signals 112 and 113 between samples, and outputs I/Q zero-crossing signals 114 and 115. If there has been a change in sign, zero-crossing signals 114 and 115 are set to high for one sample.

Figure 35:
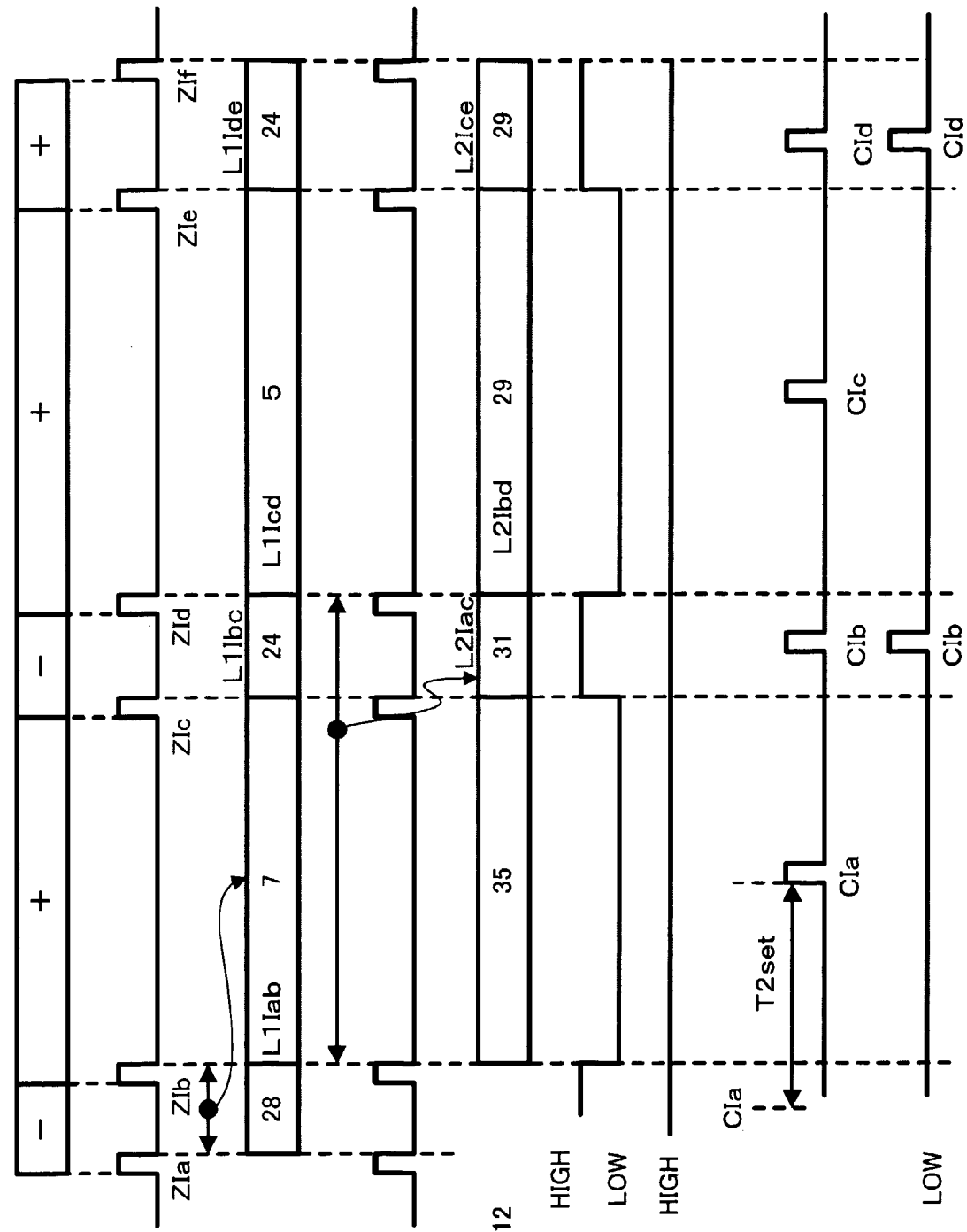
FIG. 35 shows part of a timing chart of signals relating to the I-component of a detected signal that includes +20° phase shift and noise.

FIG. 35 shows part of a timing chart of signals relating to the I-component of the detected signal that includes +20° phase shift and noise.

In FIG. 35, the temporal positions of zero-crossing signals 114 are ZIa, ZIb, ZIc, ZId, ZIe and ZIf, from least to most recent. Interval detection unit 102 counts the sample interval between adjacent zero-crossing signals 114. In FIG. 35, sample interval L1Iab (ZIa to ZIb) is shown to be 7 samples. 1-interval judgment unit 103 judges whether interval signal 116 is within a predetermined range defined by T1min and T1max.

Here, T1min and T1max are set respectively to 0.5 T (=8 samples) and 1.5 T (=24 samples) in a similar manner to embodiment 1 (T=1 symbol period). Accordingly, 1-interval judgment unit 103 validates intervals L1Ibc (ZIb to ZIc=24) and L1Ide (ZId to ZIe=24) within the 8 to 24 sample range, and outputs 1-interval control signals 120 at high (valid). On the other hand, 1-interval judgment unit 103 invalidates the intervals L1Iab (ZIa to ZIb =7) and L1Icd (ZIc to ZId=5) outside the prescribed range, and outputs 1-interval control signals 120 at low (invalid).

Interval signal 116 is also input to 2-interval judgment unit 104. Storage unit 1600 in 2-interval judgment unit 104 stores interval signal 116 every time timing signal 117 is input from interval detection unit 102. Adder 1602 sums the current interval signal 116 and the value (i.e. preceding interval signal 1610) stored in storage unit 1600 to obtain 2-interval signal 1612. This results in intervals L2Iac=31 (L1Iab+L1Ibc=7+24), L2Ibd=29 (L1Ibc+L1Icd=24+5), and L2Ice=29 (L1Icd+

L1Ide=5+24), as shown in FIG. 35. Judgment unit 1604 judges whether these 2-interval signals 1612 are within a predetermined range defined by T2min and T2max.

Here, T2min and T2max are set respectively to 1.5 T (=24 samples) and 2.5 T (=40 samples) in a similar manner to embodiment 1. Since 2-interval signals 1612 in FIG. 35 are all between 24 and 40 samples, 2-interval control signals 122 are output at high (valid). Accordingly, with delayed center signals 3110, CIb and CId are validated, while CIa and CIc are invalidated.

Thus, center signals occurring between short zero-crossing intervals are validated, while those occurring between long zero-crossing intervals are invalidated. Also, the alternating bit sequence pattern of the input signal means that center signals are output at integer multiples of the symbol cycle.

Accordingly, valid eyes are thus selected most accurately, enabling valid phase error information to be obtained.

Q-axis zero crossings are similarly discussed next.

Figure 36:
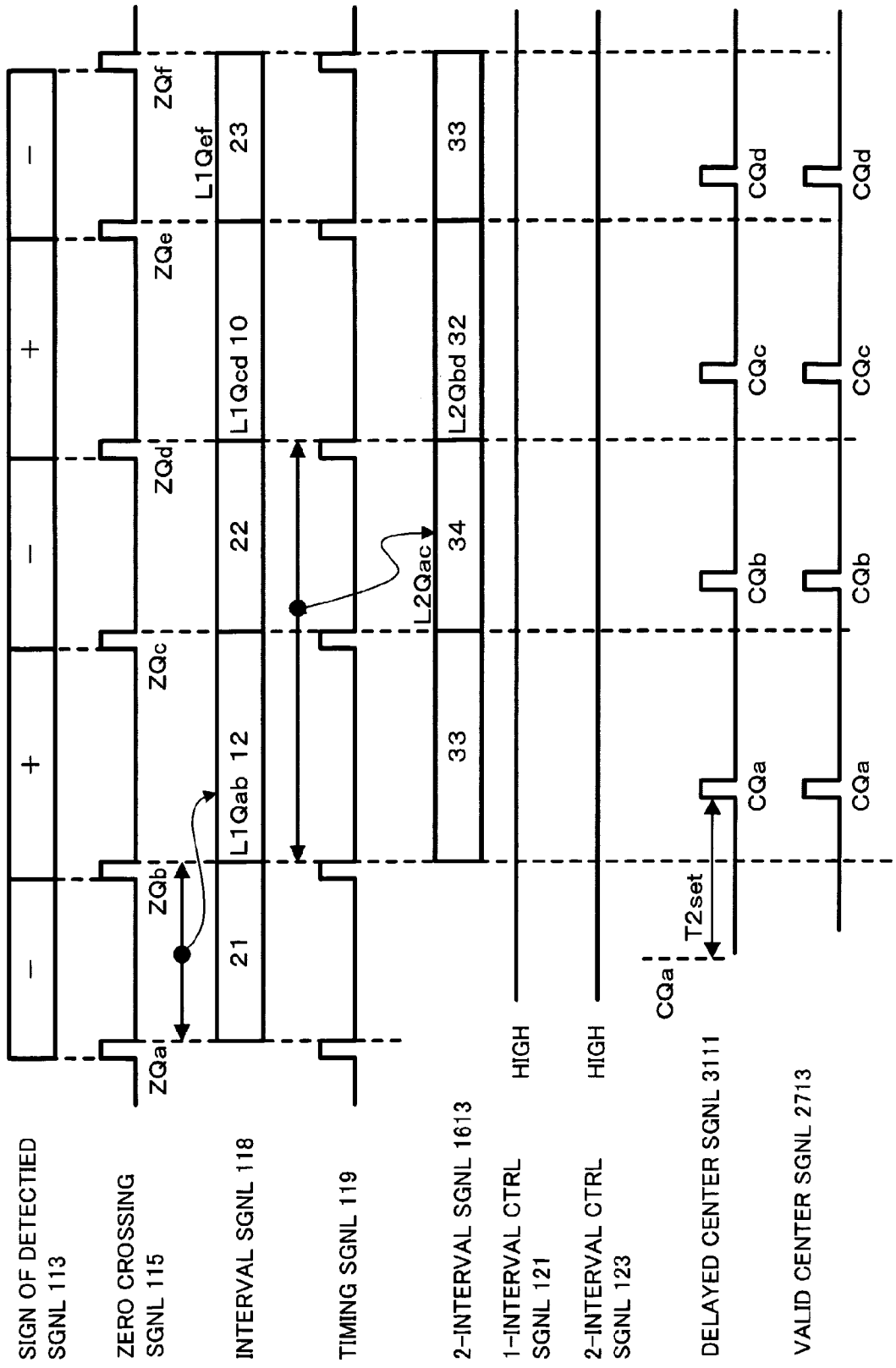
FIG. 36 shows part of a timing chart relating to the Q-component of a detected signal that includes +20° phase shift and noise.
Figure 37:
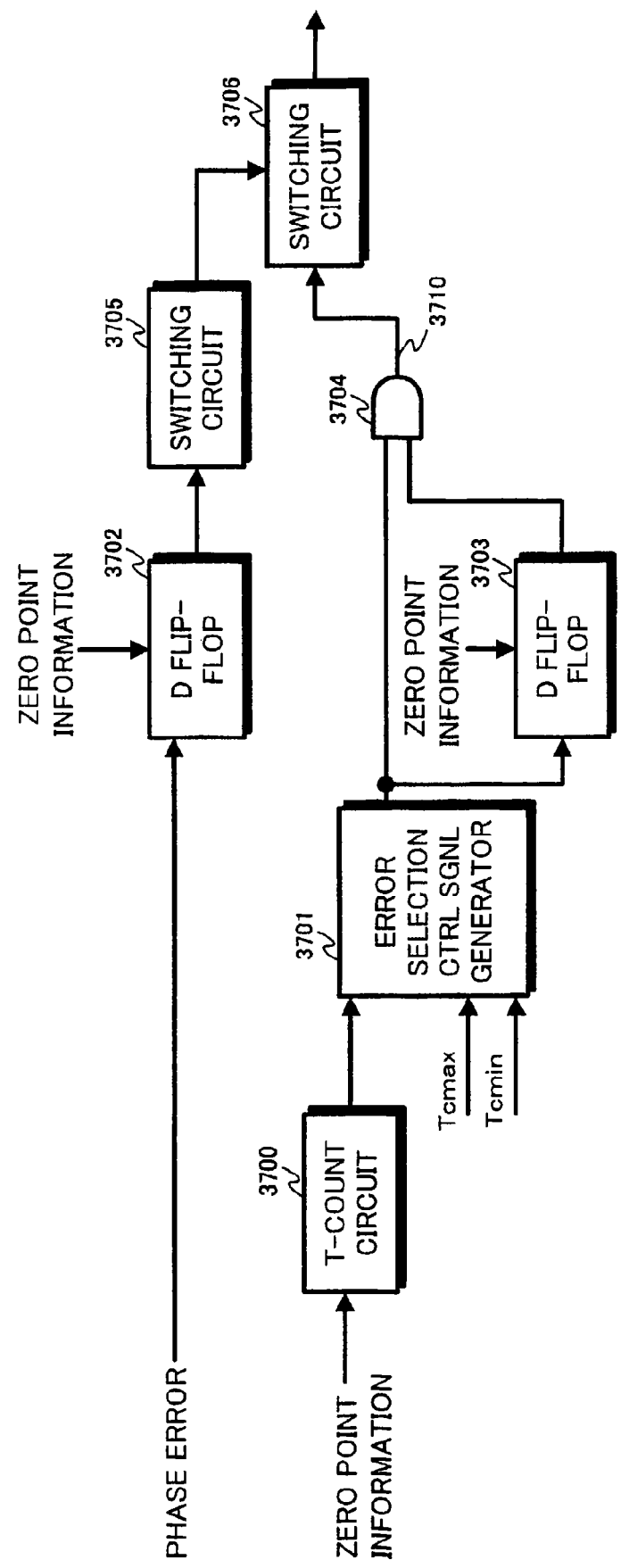
FIG. 37 is a block diagram showing the structure of an error selection circuit in a conventional clock recovery circuit.

FIG. 36 shows part of a timing chart of signals relating to the Q-component of the detected signal that includes +20° phase shift and noise.

In FIG. 36, the temporal positions of zero-crossing signals 115 are shown as ZQa, ZQb, ZQc, ZQd, ZQe and ZQf. Interval detection unit 102 counts the sample interval between zero-crossing signals 115. In FIG. 36, sample intervals L1Qab (ZQa to ZQb) and L1Qbc (ZQb to ZQc) are shown to be 12 and 22 samples, respectively. 1-interval judgment unit 103 judges whether interval signal 118 is within the predetermined range defined by T1min (8 samples) and T1max (24 samples). Accordingly, 1-interval judgment unit 103 validates all of interval signals 118 in FIG. 36 (i.e. all between 8 and 24 samples), and outputs all 1-interval control signals 121 at high (valid).

Interval signal 118 is also input to 2-interval judgment unit 104. Similarly to the I-component, storage unit 1601 in 2-interval judgment unit 104 stores interval signal 118 every time timing signal 119 is input from interval detection unit 102. Adder 1603 sums the current interval signal 118 and the value (i.e. preceding interval signal 1611) stored in storage unit 1601 to obtain 2-interval signal 1613. This results in intervals L2Qac=34 (L1Qab+L1Qbc=12+22), L2Qbd=32 (L1Qbc+L1Qcd=22+10), and L2Qce=33 (L1Qcd+L1Qde=10+23), as shown in FIG. 36. Judgment unit 1605 judges whether these intervals are within the predetermined range defined by T2min (24 samples) and T2max (40 samples).

Since 2-interval signals 1613 in FIG. 36 are all between 24 and 40 samples, 2-interval control signals 123 are output at high (valid). Accordingly, delayed center signals 3111 are all validated, and valid center signals 2713 are output at high.

As illustrated above, clock recovery circuit 27 is able to validate the Q-component (115) of zero-crossing signals occurring within the symbol cycle, while invalidating the I-component (114) of zero-crossing signals occurring outside of the symbol cycle, using the alternating PR sequence pattern at the head of the frame, in relation to a detected signal having an arc-shaped transition in a multipath environment as shown in FIG. 34, thereby allowing for faster phase locking of the symbol clock at the head of each burst. While the above description illustrates the case of +20° phase shift, it should be noted that similar effects are obtained in the case of −20° phase shift, since clock recovery circuit 1 similarly validates the I-component (114) of zero-crossing signals occurring within the symbol cycle, while invalidating the Q-component (115) of zero-crossing signals occurring outside of the symbol cycle.

Next, clock generation unit 107 adjusts the clock phase based on phase error information 126 and 127. The generated symbol clock 128 is input to PEC circuit 402 shown in FIG. 28, and used to derive correct phase correction values. Frame reception circuit is set to high at the end of UW reception, and switching unit 2702 switches from valid center signals 2712 and 2713 to outputting zero-crossing signals 114 and 115 as phase error information 126 and 127.

Note that while receiver 28 includes PEC circuit 402, in the case of PEC circuit 402 not being included (i.e. detected signal 411 from detection unit 401 output directly to clock recovery circuit 27), the symbol clock can still be recovered using the alternating pattern with respect to frame signals that include frequency shift.

Modifications

While preferred embodiments of the present invention have been illustrated above, the present invention is of course not limited to these embodiments. The applicable scope of the present invention is enumerated below.

Figure 11:
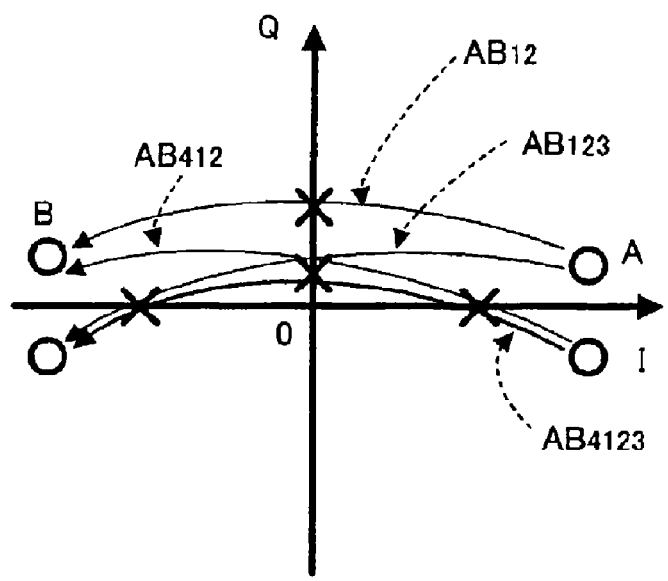
FIG. 11 is a schematic diagram showing the detected signal in FIG. 10 crossing the I/Q axes.
Figure 12:
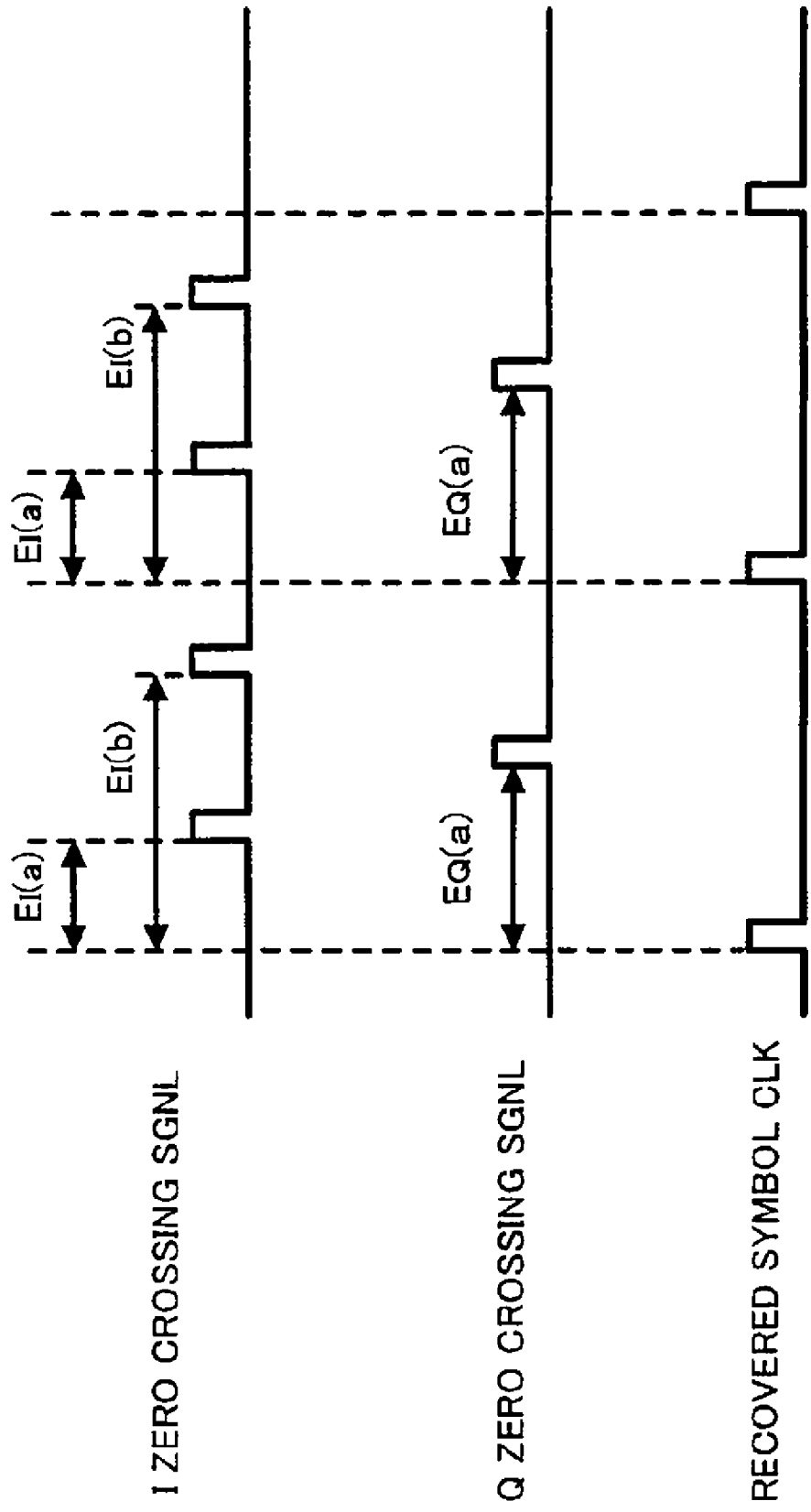
FIG. 12 is a schematic diagram showing zero-crossing signals and phase errors for a transition $AB_{4123}$.

(A) While π/4 DQPSK-VP modulation was used in embodiment 2, similar effects can still be expected with π/4 DQPSK modulation in the case of transitions $AB_{123}$ and $AB_{412}$ shown in FIG. 11 because of the deterioration in the duty ratio of the zero-crossing intervals. As for transitions $AB_{12}$, only the phase error information relating to one of the axes (I-axis in FIG. 11) is invalidated because of the maximum 1-interval length T1max being exceeded.

(B) The present invention is not dependent on the modulation scheme used, since it is applicable in the case of the input signal including an alternating pattern in which the phase of adjacent symbols inverts 180°. Thus, the present invention exhibits the stated effects with respect to PSK digital modulation schemes including BPSK (Binary Phase Shift Keying), QPSK, π/4 QPSK, 8 PSK, π/8 8 PSK, 8 PSK-VP, and π/8 8 PSK-VP.

The reasons for π/8 8 PSK-VP modulation being applicable are described here.

FIG. 38 is a signal space diagram of a predetection π/8 8 PSK signal.

FIG. 39 shows an exemplary π/8 8 PSK differential encoding rule.

Figure 3:
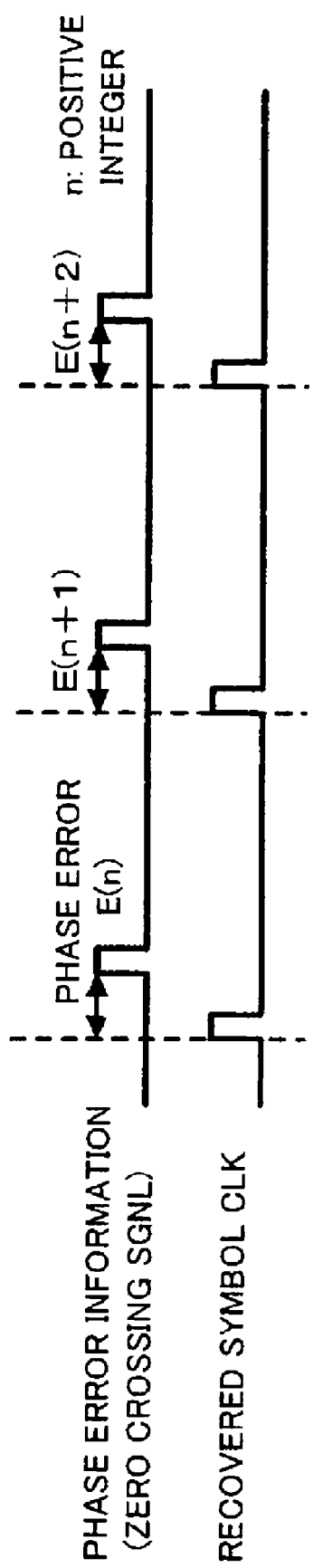
FIG. 3 schematically shows clock adjustment in a clock recovery circuit.

In FIG. 38, 3-bit transmission data is allocated in pairs to each symbol, and the signal transits according to the differential encoding rule shown in FIG. 3. For example, from point A, the symbol transits from signal point S1 to S8 according to the transmission data.

FIG. 40 is a signal space diagram of a differentially detected π/8 8 PSK signal.

Figure 41:
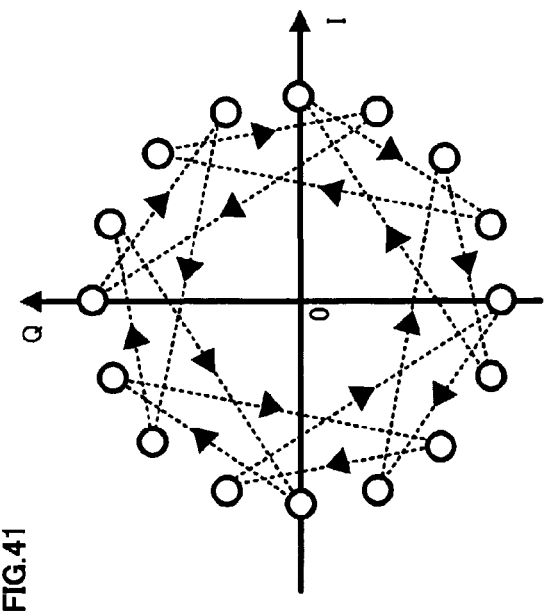
FIG. 41 is a schematic diagram showing the transition of a predetection π/8 8 PSK signal when an alternating pattern.

FIG. 41 is a schematic diagram showing the transition of the predetection π/8 8 PSK signal when the alternating pattern.

As shown in FIG. 40, for example, signal points S3 and S7 are selected when using a repeating bit sequence "011 101" as the PR alternating pattern. At this time, the signal points repeatedly transit between −3π/8 and 5π/8, as shown in FIG. 41.

Figure 42:
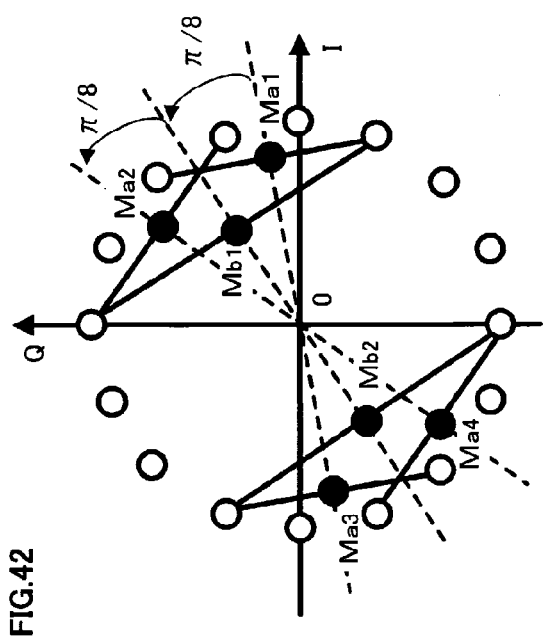
FIG. 42 is a schematic diagram showing intermediate points in the transition of a predetection π/8 8 PSK signal when an alternating pattern.

FIG. 42 is a schematic diagram showing intermediate points in the transition of the predetection π/8 8 PSK signal when the alternating pattern.

At this time, the intermediate points ($M_{an}$, $M_{bn}$, where n=1, 2, 3, 4) of the signal transition shown in FIG. 42 are expressed as $M_{a1}: m_a \cdot \exp(\pi/16)$, $M_{b1}: m_b \cdot \exp(3\pi/16)$ $M_{a2}: m_a \cdot \exp(5\pi/16)$, $M_{b2}: m_b \cdot \exp(-13\pi/16)$ $M_{a3}$: $m_a \cdot \exp(-15\pi/16)$ $M_{a4}$: $m_a \cdot \exp(-11\pi/16)$ Therefore, the differential detection output at adjacent intermediate points ($M_{a1}$ & $M_{b1}$, $M_{b1}$ & $M_{a2}$, $M_{a3}$ & $M_{b2}$, $M_{b2}$ & $M_{a4}$) for all combinations can be expressed as $$m_a m_b \cdot \exp(\pi/8). \tag{6}$$

Expression 6 indicates that the transition of the differentially detected signal always has a component in a π/8 phase direction between two signal points. FIG. 42 only shows some of the transitions, although the remaining transitions are similar.

Figure 43:
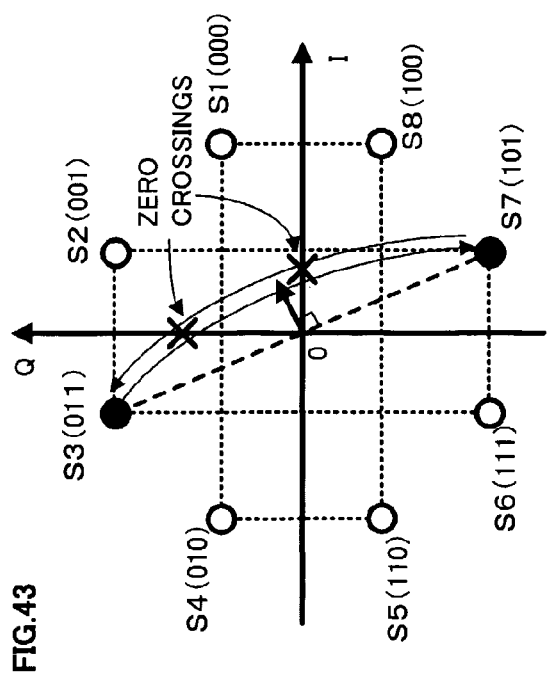
FIG. 43 is a schematic diagram showing the transition of a detected π/8 8 PSK signal when an alternating pattern.

FIG. 43 shows the transition of a detected π/8 8 PSK signal when the alternating pattern.

Figure 44:
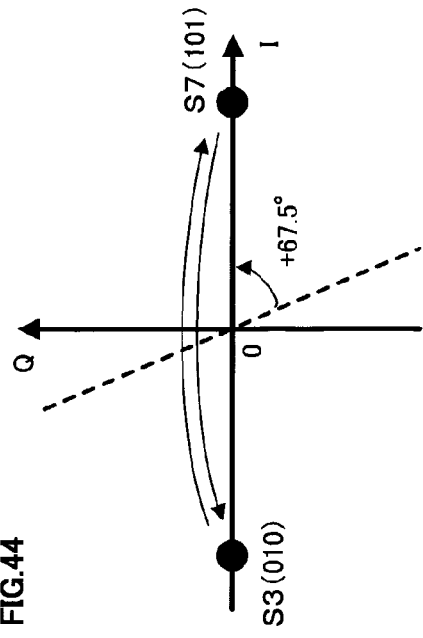
FIG. 44 is a schematic diagram showing the transition of a detected π/8 8 PSK signal that includes +67.5° phase shift.

As shown in FIG. 43, the signal has a component in the π/8 phase direction orthogonal to the alternating axis at intermediate transition points, which means that the signal transmits in the same direction relative to the alternating axis. Thus with π/8 8 PSK modulation, the transition of the differentially detected signal is arc-shaped when the bit sequence is an alternating pattern in signal space. Accordingly, in the case of +67.5° phase shift as shown in FIG. 44, multiple zero crossings occur per symbol period. In view of this, the use of a clock recovery circuit pertaining to the present invention enables faster phase locking of the symbol clock at the head of each burst to be achieved because of the clock recovery circuit effectively judging the validity of zero-crossing signals in which multiple zero crossings occur per symbol period. Note that similar effects are exhibited even in the case of π/8 8 PSK-VP modulation, because of the signal space diagram being the same as that for π/8 8 PSK modulation in FIG. 38.

(C) As described in the above modification B, a clock recovery circuit pertaining to the present invention exhibits the stated effects because of the arc-shaped signal transition when the alternating pattern, particularly with π/4 QPSK and π/8 8 PSK modulation and the like, according to which the signal points of adjacent symbols phase-shifted by a prescribed amount transit in pairs. However, a clock recovery circuit pertaining to the present invention can also be applied with modulation schemes that do not involve phase shifting, such as BPSK, QPSK and 8 PSK. The reasons for this are described here.

BPSK Application

FIG. 45 is a signal space diagram of a detected BPSK signal.

FIG. 46 shows an exemplary BPSK encoding rule.

As shown in FIG. 45, two signal points of the detected BPSK signal transit in accordance with the FIG. 46 encoding rule.

FIG. 47 is a schematic diagram of signal transition with additive noise in the detected BPSK signal.

FIG. 48 is a schematic diagram showing zero crossings of the detected BPSK signal in FIG. 47 along the I-axis.

The signal transition when moving from signal point A in the $4^{th}$ quadrant to signal point B in the $2^{nd}$ or $3^{rd}$ quadrants is as shown in FIG. 48. As is apparent from FIG. 48, multiple zero crossings occur per symbol period with transition $AB_{4123}$. In view of this, if the detected signals are used as zero-crossing signals in a clock recovery circuit pertaining to the present invention, faster phase locking of the symbol clock at the head of each burst can be achieved because of the clock recovery circuit effectively judging the validity of zero-crossing signals in which multiple zero crossings occur per symbol period, as with transition $AB_{4123}$.

QPSK Application

FIG. 49 is a signal space diagram of a detected QPSK signal.

FIG. 50 shows an exemplary QPSK encoding rule.

As shown in FIG. 49, 2-bit transmission data is allocated to each symbol, and the signal transits according to the FIG. 50 encoding rule. For example, signal points S2 and S4 are selected when using a repeating bit sequence "01 10" as the PR alternating pattern in FIG. 49.

FIG. 51 is a schematic diagram showing the transition of a detected QPSK signal that includes +45° phase shift when the alternating pattern.

As shown in FIG. 51, the signal transits over the I-axis when +45° phase shift occurs. Consequently, multiple zero crossings occur per symbol period when noise is included, as was shown in FIG. 48. In view of this, if the detected signals are used as zero-crossing signals in a clock recovery circuit pertaining to the present invention, faster phase locking of the symbol clock at the head of each burst can be achieved because of the clock recovery circuit effectively judging the validity of zero-crossing signals in which multiple zero crossings occur per symbol period.

8 PSK Application

FIG. 52 is a signal space diagram of a detected 8 PSK signal.

FIG. 53 shows an exemplary 8 PSK encoding rule.

As shown in FIG. 52, 3-bit transmission data is allocated in groups to each symbol, and the signal transits according to the FIG. 53 encoding rule. For example, signal points S1 and S5 are selected when using a repeating bit sequence "000 110" as the PR alternating pattern in FIG. 52.

FIG. 54 is a schematic diagram showing the transition of a detected 8 PSK signal that includes +45° phase shift when the alternating pattern.

In this case, the signal transits along the I-axis, as shown in FIG. 54. Consequently, multiple zero crossings occur per symbol period when noise is included, as was shown in FIG. 48. In view of this, if the detected signals are used as zero-crossing signals in a clock recovery circuit pertaining to the present invention, faster phase locking of the symbol clock at the head of each burst can be achieved because of the clock recovery circuit effectively judging the validity of zero-crossing signals in which multiple zero crossings occur per symbol period.

(D) In the preferred embodiments, the symbol clock (i.e. zero-crossing signal) is ignored (invalidated) if either one of a 1 zero-crossing interval and a 2 zero-crossing interval is outside a prescribed interval range. However, the present invention also includes a configuration that targets only a 2 zero-crossing interval, and ignores the symbol clock if the 2 zero-crossing interval is outside a prescribed interval range. This is effective in relation to zero-crossing signals obtained from zero crossings that occur twice per symbol period.

(E) In the preferred embodiments, judgments were made as to whether 1 and 2 zero-crossing intervals fall within prescribed interval ranges. However, these judgments may be made in relation 2 and 3 zero-crossing intervals, or in relation to N and M zero-crossing intervals (N, M≧2; N>M). While ignored zero crossings increase in number proportionately with increases in the number of zero crossing intervals, the precision of the generated symbol clock is also increased.

(F) At least part of the clock recovery circuits shown in FIGS. 1 and 27 or a receiver that includes these clock recovery circuits can be integrated into a single LSI chip.

INDUSTRIAL APPLICABILITY

A clock recovery circuit and receiver pertaining to the present invention can be used in a variety of cable and wireless communication systems as a result of being able to achieve fast phase locking with respect to signals that include an alternating pattern in which the phase of adjacent symbols inverts by 180°. A clock recovery circuit and receiver pertaining to the present invention can also be used in digital signal players and the like that play information recorded on recording media, because of it being possible to anticipate similar effects with respect to patterns in which the polarity of binary digital data changes successively.

The invention claimed is:

1. A clock recovery circuit for recovering a symbol clock from a detection signal obtained by detecting a modulation signal, comprising:
   an in-phase component processing unit operable to generate a phase error information signal with reference to an in-phase component signal generated from the detection signal,
   a quadrature component processing unit operable to generate a phase error information signal with reference to the quadrature component signal generated from the detection signal, and
   a clock generation unit, wherein
   the in-phase component processing unit and the quadrature processing unit each include
   an N-interval detection unit operable to detect an N zero-crossing interval with reference to N+1 zero-crossing signals obtained from the input signal, where N is an integer greater than or equal to 2;
   a judgment unit operable to judge whether the N zero-crossing interval is within a predetermined interval range; and
   the clock generation unit generates a symbol clock by performing timing adjustment according to the phase error information signal that is output according to whether the result of the judgment is affirmative or negative.

2. The clock recovery circuit of claim 1, wherein the judgment unit outputs the phase error information signal by using the N+1 zero-crossing signals as valid zero-crossing signals in generating the symbol clock if judged in the affirmative, and ignores at least one of the N+1 zero-crossing signals in generating the symbol clock if judged in the negative.

3. The clock recovery circuit of claim 2, wherein the clock generation unit includes a circuit operable to adjust a timing of the generated symbol clock based on a phase error with a valid zero-crossing signal, and output the adjusted symbol clock.

4. The clock recovery circuit of claim 2, wherein the in-phase component processing unit and the quadrature processing unit each include a circuit operable to generate a pulse at a center of adjacent zero crossings with reference to a valid zero-crossing signal determined by the judgment unit, adjust a timing of the generated symbol clock based on a phase error with the generated pulse, and output the adjusted symbol clock.

5. The clock recovery circuit of claim 2, wherein N=2, and a minimum time interval of 1 to 2 symbol periods is set as the predetermined interval range.

6. The clock recovery circuit of claim 5, wherein a maximum time interval of 2 to less than 3 symbol periods is set as the predetermined interval range.

7. The clock recovery circuit of claim 2, wherein the N-interval detection unit includes:
   a zero-crossing detection subunit operable to detect zero crossings based on the input signal;
   a counting subunit operable to measure a time interval between adjacent zero crossings; and
   an adding subunit operable to sum N number of adjacent intervals, and output the result as an N-interval control signal.

8. The clock recovery circuit of claim 7, wherein the input signal is an in-phase or quadrature component of a signal obtained by detecting a modulated signal.

9. The clock recovery circuit of claim 6, further comprising:
   a 1-interval detection unit operable to detect a 1 zero-crossing interval between adjacent zero-crossings, wherein
   the judgment unit judges whether the 1 zero-crossing interval is within a predetermined interval range, and only judges in the affirmative if the 1 zero-crossing interval and the 2 zero-crossing interval are both within respective predetermined interval ranges.

10. The clock recovery circuit of claim 9, wherein the clock generation unit includes a circuit operable to adjust a timing of the generated symbol clock based on a phase error with a valid zero-crossing signal, and output the adjusted symbol clock.

11. The clock recovery circuit of claim 9, wherein the clock generation unit includes a circuit operable to generate a pulse at a center of adjacent zero crossings with reference to a valid zero-crossing signal, adjust a timing of the generated symbol clock based on a phase error with the generated pulse, and output the adjusted symbol clock.

12. A clock recovery circuit for recovering a symbol clock from a signal obtained by detecting a modulated signal, comprising:
   an I-component processing unit operable to generate phase error information with reference to an in-phase signal obtained from the detected signal;
   an Q-component processing unit operable to generate phase error information with reference to a quadrature signal obtained from the detected signal; and
   a clock generation unit operable to generate and output a symbol clock based on phase error information, wherein
   each processing unit includes an N-interval detection subunit and an M-interval detection subunit (N, M=positive integers; N>M), judges whether an N zero-crossing interval and an M zero-crossing interval detected by the N and M interval detection subunits are within respective predetermined interval ranges based on a zero-crossing signal obtained from each of the in-phase signal and the quadrature signal, validates the zero-crossing signal if judged in the affirmative for both the N and M zero-crossing intervals, and invalidates the zero-crossing signal if judged in the negative for either the N or M zero-crossing interval, and
   if one of the processing units invalidates and the other processing unit validates, the clock generation unit adjusts a phase of the symbol clock based on the phase error information of the validating processing unit, and outputs the phase-adjusted symbol clock.

13. The clock recovery circuit of claim 12, wherein
   the modulated signal has a frame structure that includes a preamble, a unique word and data, and
   the clock recovery circuit further comprises a switching circuit operable to output zero-crossing signals validated by the processing units to the clock generation unit as phase error information when the detected signal corresponds to one of the preamble and the unique word, and to output the zero-crossing signals obtained from the in-phase and quadrature signals to the clock generation unit as phase error information when the detected signal corresponds to the data.

14. A clock recovery circuit for recovering a symbol clock from an input signal that includes a preamble, comprising:
a zero-crossing detection unit operable to detect a temporal position of zero crossings from the input signal, and output zero-crossing signals;
an interval detection unit operable to derive a time interval between adjacent zero crossings from the zero-crossing signals, and output interval signals;
a 1-interval judgment unit operable to judge whether each interval signal is within a predetermined interval range;
a 2-interval judgment unit operable to generate a 2-interval signal by summing two adjacent interval signals, and judge whether the 2-interval signal is within a predetermined interval range;
a control unit operable to validate or invalidate each zero-crossing signal based on a judgment result of the judgment units, and output a valid zero-crossing signal; and
a clock generation unit operable to generate a symbol clock based on the valid zero-crossing signal.

15. The clock recovery circuit of claim 14, wherein
the 1-interval judgment unit holds a minimum time interval of 0 to 1 symbol periods and a maximum time interval 1 to 2 symbol periods as the predetermined interval range, and
the 2-interval judgment unit holds a minimum time interval of 1 to 2 symbol periods and a maximum time interval of 2 to less than 3 symbol periods as the predetermined interval range.

16. A clock recovery circuit for recovering a symbol clock from a signal obtained by detecting a modulated signal, comprising:
a zero-crossing detection subunit operable to detect a temporal position of zero crossings from the in-phase and quadrature signals obtained from the detected signal, and output in-phase zero-crossing signals and quadrature zero-crossing signals;
an interval detection subunit operable to derive a time interval between adjacent zero crossings from the in-phase and quadrature zero-crossing signals, and output in-phase interval signals and quadrature interval signals;
a center detection subunit operable to detect a temporal position of a center between adjacent in-phase and adjacent quadrature zero-crossing signals, and output in-phase center signals and quadrature center signals;
a M-interval judgment subunit operable to judge whether each in-phase and quadrature interval signal is within a predetermined interval range;
a N-interval judgment subunit operable to sum two adjacent in-phase interval signals and N adjacent quadrature interval signals to generate an in-phase N-interval signal and a quadrature N-interval signal, and judge whether each in-phase and quadrature N-interval signal is within a predetermined interval range (N, M=positive integers; N>M);
a control subunit operable to validate or invalidate each in-phase and quadrature center signal based on a judgment result of the judgment subunits, and output in-phase and quadrature valid center signals;
a clock generation subunit operable to generate a symbol clock based on the in-phase and quadrature valid center signals output from the control subunit.

17. The clock recovery unit of claim 16, wherein M=1 and N=2, and
the 1-interval judgment unit holds a minimum time interval of 0 to 1 symbol periods and a maximum time interval 1 to 2 symbol periods as the predetermined interval range,
and the 2-interval judgment unit holds a minimum time interval of 1 to 2 symbol periods and a maximum time interval 2 to less than 3 symbol periods as the predetermined interval range.

18. The clock recovery circuit of claim 17, wherein the modulated signal has a frame structure that includes a preamble, a specific pattern and data, and the clock recovery circuit further comprising:
a frame detection subunit operable to detect the specific pattern from the in-phase and quadrature signals, and output a frame reception signal indicating the data reception;
a switching circuit operable to
output in-phase and quadrature valid center signals validated by the control subunit to the clock generation subunit as phase error information when the detected signal corresponds to one of the preamble and the unique word, and
to output the zero-crossing signals obtained from the zero-crossing detection subunit to the clock generation unit as phase error information when the detected signal corresponds to the data based on the frame reception signal.

\* \* \* \* \*